US012711788B2

(12) United States Patent
Zait et al.

(10) Patent No.: US 12,711,788 B2
(45) Date of Patent: Aug. 18, 2026

(54) CLASSIFICATION MODELS FOR ANALYZING A SAMPLE

(71) Applicant: S.D. SIGHT DIAGNOSTICS LTD, Tel Aviv (IL)

(72) Inventors: Amir Zait, Binyamina (IL); Dan Gluck, Kadima (IL); Arnon Houri Yafin, Jerusalem (IL); David Brailovsky, Hertzliya (IL); Yochay Shlomo Eshel, Sde Warburg (IL); Sarah Levy, Jaffa (IL); Joseph Joel Pollak, Neve Daniel (IL)

(73) Assignee: S.D. Sight Diagnostics Ltd., Tel Aviv (IL)

( * ) Notice: Subject to any disclaimer, the term of this patent is extended or adjusted under 35 U.S.C. 154(b) by 1102 days.

(21) Appl. No.: 17/783,839

(22) PCT Filed: Dec. 10, 2020

(86) PCT No.: PCT/IB2020/061732
§ 371 (c)(1),
(2) Date: Jun. 9, 2022

(87) PCT Pub. No.: WO2021/116960
PCT Pub. Date: Jun. 17, 2021

(65) Prior Publication Data

US 2023/0026108 A1 Jan. 26, 2023

Related U.S. Application Data

(60) Provisional application No. 62/947,004, filed on Dec. 12, 2019.

(51) Int. Cl.
*G06V 20/69* (2022.01)
*G06T 7/00* (2017.01)

(52) U.S. Cl.
CPC .......... *G06V 20/698* (2022.01); *G06T 7/0012* (2013.01); *G06T 2207/10056* (2013.01); *G06T 2207/30024* (2013.01)

(58) Field of Classification Search
None
See application file for complete search history.

(56) References Cited

U.S. PATENT DOCUMENTS 3,203,768 A 8/1965 Tiller et al.
3,603,156 A 9/1971 Konkol
(Continued)

FOREIGN PATENT DOCUMENTS

CA 2655024 C 11/2014
CN 1918501 A 2/2007
(Continued)

OTHER PUBLICATIONS

United States Second Notice of Allowance issued Aug. 23, 2023 in U.S. Appl. No. 17/490,767.
(Continued)

*Primary Examiner* — Fan Zhang
(74) *Attorney, Agent, or Firm* — Sughrue Mion, PLLC

(57) ABSTRACT

Apparatus and methods are described including analyzing one or more microscopic images of the blood sample using a machine-learning classifier. An entity within the one or more microscopic images is identified using a first classification model, and a first estimated concentration of the entity within the sample is determined, based upon the entity as identified using the first classification model. The entity is identified within the one or more microscopic images using a second classification model, and a second estimated concentration of the entity within the sample is determined, based upon the entity as identified using the second classification model. The first and second estimated concentra-
(Continued)

tions are compared to each other, and, in response to the comparison, a hybrid classification model that is a hybrid of the first and second classification models is used. Other applications are also described.

4 Claims, 10 Drawing Sheets

(56) References Cited

U.S. PATENT DOCUMENTS 3,676,076 A 7/1972 Grady
3,786,184 A 1/1974 Pieters
3,916,205 A 10/1975 Kleinerman
3,967,056 A 6/1976 Yata et al.
4,030,888 A 6/1977 Yamamoto
4,076,419 A 2/1978 Kleker
4,097,845 A 6/1978 Bacus
4,199,748 A 4/1980 Bacus
4,209,548 A 6/1980 Bacus
4,350,884 A 9/1982 Vollath
4,453,266 A 6/1984 Bacus
4,454,235 A 6/1984 Johnson
4,494,479 A 1/1985 Drury et al.
4,580,895 A 4/1986 Patel
4,700,298 A 10/1987 Palcic et al.
4,761,381 A 8/1988 Blatt et al.
4,774,192 A 9/1988 Terminiello et al.
4,803,352 A 2/1989 Bierleutgeb
4,849,430 A 7/1989 Fleet
4,851,330 A 7/1989 Kohne
4,902,101 A 2/1990 Fujihara et al.
5,001,067 A 3/1991 Coleman et al.
5,064,282 A 11/1991 Curtis
5,229,265 A 7/1993 Tometsko
5,281,517 A 1/1994 Bacus et al.
5,300,779 A 4/1994 Hillman et al.
5,331,958 A 7/1994 Oppenheimer
5,376,790 A 12/1994 Linker et al.
5,430,542 A 7/1995 Shepherd et al.
5,470,751 A 11/1995 Sakata et al.
5,499,097 A 3/1996 Ortyn et al.
5,566,249 A 10/1996 Rosenlof et al.
5,625,706 A 4/1997 Lee et al.
5,663,057 A 9/1997 Drocourt et al.
5,671,288 A 9/1997 Wilhelm et al.
5,672,861 A 9/1997 Fairley et al.
5,674,457 A 10/1997 Williamsson et al.
5,745,804 A 4/1998 Iwane
5,782,770 A 7/1998 Mooradian et al.
5,784,162 A 7/1998 Cabib et al.
5,827,190 A 10/1998 Palcic et al.
5,834,217 A 11/1998 Levine et al.
5,932,872 A 8/1999 Price
5,939,709 A 8/1999 Ghislain et al.
5,948,686 A 9/1999 Wardlaw et al.
5,978,497 A 11/1999 Lee et al.
5,985,595 A 11/1999 Krider et al.
5,993,702 A 11/1999 Davis
6,005,964 A 12/1999 Reid et al.
6,027,695 A 2/2000 Oldenburg
6,064,474 A 5/2000 Lee
6,074,879 A 6/2000 Zelmanovic
6,101,404 A 8/2000 Yoon
6,235,536 B1 5/2001 Wardlaw
6,262,423 B1 7/2001 Hell et al.
6,262,798 B1 7/2001 Shepherd et al.
6,320,979 B1 11/2001 Melen
6,330,348 B1 12/2001 Kerschmann et al.
6,339,472 B1 1/2002 Hafeman
6,350,613 B1 2/2002 Wardlaw et al.
6,448,024 B1 9/2002 Bruegger
6,519,355 B2 2/2003 Nelson
6,554,788 B1 4/2003 Hunley et al.
6,582,964 B1 6/2003 Samsoondar et al.
6,611,777 B2 8/2003 Samsoondar
6,632,681 B1 10/2003 Chu
6,658,143 B2 12/2003 Hansen
6,664,528 B1 12/2003 Cartlidge et al.
6,711,516 B2 3/2004 Samsoondar
6,799,119 B1 9/2004 Voorhees et al.
6,819,408 B1 11/2004 Scrivens et al.
6,831,733 B2 12/2004 Pettersson
6,834,237 B2 12/2004 Noergaard et al.
6,836,559 B2 12/2004 Abdel-Fattah
6,842,233 B2 1/2005 Narisada
6,866,823 B2 3/2005 Wardlaw
6,872,930 B2 3/2005 Cartlidge et al.
6,898,451 B2 5/2005 Wuori
6,903,323 B2 6/2005 Cartlidge et al.
6,929,953 B1 8/2005 Wardlaw et al.
6,949,384 B2 9/2005 Samsoondar
6,955,872 B2 10/2005 Maples et al.
6,956,650 B2 10/2005 Boas
6,989,891 B2 1/2006 Braig et al.
7,027,628 B1 4/2006 Gagnon
7,030,351 B2 4/2006 Wasserman
7,034,883 B1 4/2006 Rosenqvist
7,105,795 B2 9/2006 Cartlidge et al.
7,132,636 B1 11/2006 Cartlidge
7,133,547 B2 11/2006 Marcelpoil
7,151,246 B2 12/2006 Fein et al.
7,155,049 B2 12/2006 Wetzel
7,248,716 B2 7/2007 Fein et al.
7,274,810 B2 9/2007 Reeves et al.
7,283,217 B2 10/2007 Ikeuchi
7,288,751 B2 10/2007 Cartlidge et al.
7,305,109 B1 12/2007 Gagnon
7,324,694 B2 1/2008 Chapoulaud
7,329,537 B2 2/2008 Qiu
7,338,168 B2 3/2008 Cartlidge et al.
7,344,890 B2 3/2008 Perez et al.
7,346,205 B2 3/2008 Walker, Jr.
7,369,696 B2 5/2008 Arini et al.
7,385,168 B2 6/2008 Cartlidge et al.
7,387,898 B1 6/2008 Gordon
7,411,680 B2 8/2008 Chang
7,417,213 B2 8/2008 Krief et al.
7,425,421 B2 9/2008 Dertinger
7,439,478 B2 10/2008 Cartlidge et al.
7,450,223 B2 11/2008 Ikeuchi
7,450,762 B2 11/2008 Morell
7,460,222 B2 12/2008 Kalveram
7,490,085 B2 2/2009 Walker et al.
7,493,219 B1 2/2009 Qi
7,580,120 B2 8/2009 Hamada
7,599,893 B2 10/2009 Sapir
7,601,938 B2 10/2009 Cartlidge et al.
7,602,954 B2 10/2009 Marcelpoil
7,605,356 B2 10/2009 Krief
7,609,369 B2 10/2009 Simon-Lopez
7,630,063 B2 12/2009 Padmanabhan
7,633,604 B2 12/2009 Ikeuchi
7,638,748 B2 12/2009 Krief et al.
7,663,738 B2 2/2010 Johansson
7,668,362 B2 2/2010 Olson
7,692,131 B2 4/2010 Fein et al.
7,697,764 B2 4/2010 Kataoka
7,702,181 B2 4/2010 Gouch
7,706,862 B2 4/2010 Alfano et al.
7,713,474 B2 5/2010 Schulman et al.
7,747,153 B2 6/2010 Ibaraki
7,765,069 B2 7/2010 Ostoich
7,777,869 B2 8/2010 Nerin
7,787,109 B2 8/2010 Dosmann et al.
7,796,797 B2 9/2010 Nakaya et al.
7,863,552 B2 1/2011 Cartlidge et al.
7,869,009 B2 1/2011 Dosmann et al.
7,894,047 B2 2/2011 Hamada
7,911,617 B2 3/2011 Padmanabhan
7,925,070 B2 4/2011 Sumida
7,929,121 B2 4/2011 Wardlaw
7,933,435 B2 4/2011 Hunter
7,936,913 B2 5/2011 Nordell

(56) References Cited

U.S. PATENT DOCUMENTS 7,951,599 B2 5/2011 Levine
7,995,200 B2 8/2011 Matsumoto
7,998,435 B2 8/2011 Reed
8,000,511 B2 8/2011 Perz
8,044,974 B2 10/2011 Sumida
8,045,782 B2 10/2011 Li
8,055,471 B2 11/2011 Qi
8,064,680 B2 11/2011 Ramoser
8,077,296 B2 12/2011 Wardlaw
8,081,303 B2 12/2011 Levine
8,105,554 B2 1/2012 Kanigan et al.
8,125,643 B2 2/2012 Hansen
D655,421 S 3/2012 Lee et al.
8,131,035 B2 3/2012 Grady
8,131,052 B2 3/2012 Alexandrov
8,150,114 B2 4/2012 Svanberg
8,154,713 B2 4/2012 Simon-Lopez
8,165,385 B2 4/2012 Reeves
8,175,353 B2 5/2012 Westphal
8,179,597 B2 5/2012 Namba
8,184,273 B2 5/2012 Dosmann
8,192,995 B2 6/2012 Zhang et al.
8,216,832 B2 7/2012 Battrell et al.
8,224,058 B2 7/2012 Lindberg
8,269,954 B2 9/2012 Levine
8,280,134 B2 10/2012 Hoyt
8,310,659 B2 11/2012 Wardlaw
8,320,655 B2 11/2012 Sarachan
8,327,724 B2 12/2012 Fairs
8,331,642 B2 12/2012 Zerfass
8,339,586 B2 12/2012 Zahniser
8,345,227 B2 1/2013 Zahniser
8,351,676 B2 1/2013 Dai
8,363,221 B2 1/2013 Hansen
8,379,944 B2 2/2013 Grady
8,406,498 B2 3/2013 Ortyn
8,428,331 B2 4/2013 Dimarzio
8,432,392 B2 4/2013 Kim
8,477,294 B2 7/2013 Zahniser
8,481,303 B2 7/2013 Faris et al.
8,488,111 B2 7/2013 Zahniser
8,491,499 B2 7/2013 Choi et al.
8,526,704 B2 9/2013 Dobbe
8,570,496 B2 10/2013 Chen
8,582,924 B2 11/2013 De
8,638,427 B2 1/2014 Wardlaw
8,712,142 B2 4/2014 Rajpoot
8,736,824 B2 5/2014 Matsui
8,744,165 B2 6/2014 Liu
8,778,687 B2 7/2014 Levine
8,787,650 B2 7/2014 Marugame
8,792,693 B2 7/2014 Satish
8,837,803 B2 9/2014 Wang et al.
8,849,024 B2 9/2014 Shinoda
8,873,827 B2 10/2014 Mcculloch
8,877,458 B2 11/2014 Maurer
8,878,923 B2 11/2014 Henderson
8,885,154 B2 11/2014 Wardlaw
8,885,912 B2 11/2014 Sui
8,891,851 B2 11/2014 Spaulding
8,922,761 B2 12/2014 Zahniser
8,942,458 B2 1/2015 Takahashi
8,964,171 B2 2/2015 Zahniser
8,992,750 B1 3/2015 Beaty
8,994,930 B2 3/2015 Levine
9,012,868 B2 4/2015 Courtney et al.
9,041,792 B2 5/2015 Van Leeuwen
9,046,473 B2 6/2015 Levine
9,050,595 B2 6/2015 Miller et al.
9,064,301 B2 6/2015 Zie et al.
9,176,121 B2 11/2015 Winkelman et al.
9,186,843 B2 11/2015 Chan et al.
9,240,043 B2 1/2016 Christiansen
9,322,767 B2 4/2016 Ehrenkranz
9,329,129 B2 5/2016 Pollak et al.
9,342,734 B2 5/2016 Lin et al.
9,404,852 B2 8/2016 Braig et al.
9,470,609 B2 10/2016 Wimberger-Friedl
9,477,875 B2 10/2016 Ohya
9,522,396 B2 12/2016 Bachelet
9,528,978 B2 12/2016 Yamada
9,588,033 B2 3/2017 Zahniser et al.
9,767,343 B1 9/2017 Jones et al.
9,820,990 B2 11/2017 Pak et al.
9,933,363 B2 4/2018 Danuser et al.
9,934,571 B2 4/2018 Ozaki
9,976,945 B2 5/2018 Kendall et al.
10,024,858 B2 7/2018 Smith et al.
10,061,972 B2 8/2018 Champlin
10,093,957 B2 10/2018 Pollak et al.
10,169,861 B2 1/2019 Ozaki et al.
10,176,565 B2 1/2019 Greenfield
10,217,219 B2 2/2019 Rimm et al.
10,281,386 B2 5/2019 Hsu et al.
10,395,368 B2 8/2019 Berezhna et al.
10,482,595 B2 11/2019 Yorav-Raphael
10,488,644 B2 11/2019 Eshel
10,508,983 B2 12/2019 Kendall et al.
10,527,635 B1 1/2020 Bhatia et al.
10,640,807 B2 5/2020 Pollak
10,663,712 B2 5/2020 Eshel
10,843,190 B2 11/2020 Bachelet
11,099,175 B2 8/2021 Zait et al.
11,199,690 B2 12/2021 Eshel
11,609,413 B2 3/2023 Yorav-Raphael et al.
2002/0009711 A1 1/2002 Wada et al.
2002/0028158 A1 3/2002 Wardlaw et al.
2002/0028471 A1 3/2002 Oberhardt
2003/0017085 A1 1/2003 Kercso et al.
2003/0161514 A1 8/2003 Curry
2003/0170613 A1 9/2003 Straus
2003/0197925 A1 10/2003 Hamborg
2003/0208140 A1 11/2003 Pugh
2003/0224522 A1 12/2003 de Jong
2003/0227612 A1 12/2003 Fein et al.
2003/0227673 A1 12/2003 Nakagawa
2003/0231791 A1 12/2003 Torre-Bueno et al.
2004/0054283 A1 3/2004 Corey et al.
2004/0122216 A1 6/2004 Nielsen
2004/0132171 A1 7/2004 Rule et al.
2004/0170312 A1 9/2004 Soenksen
2004/0185447 A1 9/2004 Maples et al.
2004/0218804 A1 11/2004 Affleck et al.
2004/0240050 A1 12/2004 Ogihara
2004/0241677 A1 12/2004 Lin et al.
2005/0089208 A1 4/2005 Dong et al.
2005/0109959 A1 5/2005 Wasserman et al.
2005/0117204 A1 6/2005 Kinoshita et al.
2005/0175992 A1 8/2005 Aberl et al.
2005/0286800 A1 12/2005 Gouch
2006/0002817 A1 1/2006 Bohm
2006/0003458 A1 1/2006 Golovchenko et al.
2006/0045505 A1 3/2006 Zeineh
2006/0051778 A1 3/2006 Kallick
2006/0063185 A1 3/2006 Vannier
2006/0079144 A1 4/2006 Klisch et al.
2006/0187442 A1 8/2006 Chang et al.
2006/0190226 A1 8/2006 Jojic et al.
2006/0222567 A1 10/2006 Kloepfer et al.
2006/0223052 A1 10/2006 MacDonald et al.
2006/0223165 A1 10/2006 Chang et al.
2006/0244964 A1 11/2006 Cox et al.
2007/0054350 A1 3/2007 Walker
2007/0076190 A1 4/2007 Nakaya et al.
2007/0161075 A1 7/2007 Gleich
2007/0172956 A1 7/2007 Magari et al.
2007/0231914 A1 10/2007 Deng et al.
2007/0243117 A1 10/2007 Wardlaw et al.
2007/0250301 A1 10/2007 Vaisberg et al.
2007/0252984 A1 11/2007 Van Beek et al.
2008/0002868 A1 1/2008 Ando et al.
2008/0019584 A1 1/2008 Lindberg et al.
2008/0020128 A1 1/2008 van Ryper
2008/0059135 A1 3/2008 Murugkar et al.

(56) References Cited

U.S. PATENT DOCUMENTS

2008/0118399 A1 5/2008 Fleming
2008/0153098 A1 6/2008 Rimm et al.
2008/0187466 A1 8/2008 Wardlaw et al.
2008/0212069 A1 9/2008 Goldberg et al.
2008/0260369 A1 10/2008 Ibaraki
2008/0273776 A1 11/2008 Krief et al.
2008/0305514 A1 12/2008 Alford et al.
2009/0066934 A1 3/2009 Gao et al.
2009/0074282 A1 3/2009 Pinard et al.
2009/0075324 A1 3/2009 Pettersson
2009/0086314 A1 4/2009 Namba
2009/0088336 A1 4/2009 Burd et al.
2009/0128618 A1 5/2009 Fahn et al.
2009/0185734 A1 7/2009 Lindberg et al.
2009/0191098 A1 7/2009 Beard et al.
2009/0195688 A1 8/2009 Henderson et al.
2009/0197272 A1 8/2009 Hendrikis et al.
2009/0213214 A1 8/2009 Yamada
2009/0238438 A1 9/2009 Wardlaw et al.
2009/0258347 A1 10/2009 Scott
2009/0269799 A1 10/2009 Winkelman et al.
2009/0291854 A1 11/2009 Wiesinger-Mayr et al.
2010/0003265 A1 1/2010 Scheffler
2010/0068747 A1 3/2010 Herrenknecht
2010/0104169 A1 4/2010 Yamada
2010/0112631 A1 5/2010 Hur et al.
2010/0120129 A1 5/2010 Amshey et al.
2010/0136556 A1 6/2010 Friedberger et al.
2010/0136570 A1 6/2010 Goldberg et al.
2010/0152054 A1 6/2010 Love
2010/0157086 A1 6/2010 Segale et al.
2010/0172020 A1 7/2010 Price
2010/0192706 A1 8/2010 Fairs
2010/0232675 A1 9/2010 Ortyn et al.
2010/0234703 A1 9/2010 Sterling et al.
2010/0253907 A1 10/2010 Korb
2010/0254596 A1 10/2010 Xiong
2010/0256918 A1 10/2010 Chen et al.
2010/0265323 A1 10/2010 Perz
2010/0272334 A1 10/2010 Yamada et al.
2010/0295998 A1 11/2010 Sakai et al.
2010/0300563 A1 12/2010 Ramunas et al.
2011/0007178 A1 1/2011 Kahlman
2011/0009163 A1 1/2011 Fletcher
2011/0030458 A1 2/2011 Park et al.
2011/0059481 A1 3/2011 Wardlaw et al.
2011/0102571 A1 5/2011 Yoneyama
2011/0123398 A1 5/2011 Carrhilo et al.
2011/0144480 A1 6/2011 Lu et al.
2011/0149097 A1 6/2011 Danuser et al.
2011/0151502 A1 6/2011 Kendall et al.
2011/0178716 A1 7/2011 Krockenberger et al.
2011/0212486 A1 9/2011 Yamada
2011/0243794 A1 10/2011 Wardlaw
2011/0249910 A1 10/2011 Henderson
2011/0275111 A1 11/2011 Pettigrew et al.
2011/0301012 A1 12/2011 Dolecek et al.
2012/0002195 A1 1/2012 Wu et al.
2012/0013727 A1 1/2012 Breniman et al.
2012/0021951 A1 1/2012 Hess et al.
2012/0030618 A1 2/2012 Leong et al.
2012/0044342 A1 2/2012 Hing et al.
2012/0058504 A1 3/2012 Li et al.
2012/0092477 A1 4/2012 Kawano et al.
2012/0120221 A1 5/2012 Dong et al.
2012/0169863 A1 7/2012 Bachelet et al.
2012/0225446 A1 9/2012 Wimberger-Friedl et al.
2012/0237107 A1 9/2012 Tawfik et al.
2012/0275671 A1 11/2012 Eichhorn et al.
2012/0312957 A1 12/2012 Loney et al.
2012/0320045 A1 12/2012 Yao
2013/0023007 A1 1/2013 Zahniser et al.
2013/0078668 A1 3/2013 Levine et al.
2013/0130262 A1 5/2013 Battrell et al.
2013/0169948 A1 7/2013 Xie
2013/0170730 A1 7/2013 Yu et al.
2013/0176551 A1 7/2013 Wardlaw et al.
2013/0177974 A1 7/2013 Mamghani et al.
2013/0203082 A1 8/2013 Gonda et al.
2013/0236566 A1 9/2013 Higgins
2013/0273968 A1 10/2013 Rhoads et al.
2013/0284924 A1 10/2013 Mizuochi et al.
2013/0290225 A1 10/2013 Kamath et al.
2013/0315466 A1 11/2013 Drell
2013/0323757 A1 12/2013 Poher
2014/0139625 A1 5/2014 Mathuis et al.
2014/0139630 A1 5/2014 Kowalevicz
2014/0185906 A1 7/2014 Ding et al.
2014/0186859 A1 7/2014 Calderwood et al.
2014/0205176 A1 7/2014 Obrien et al.
2014/0270425 A1 9/2014 Kenny et al.
2014/0273064 A1 9/2014 Smith et al.
2014/0273076 A1 9/2014 Adams et al.
2014/0322750 A1 10/2014 Matsumoto et al.
2014/0347459 A1 11/2014 Greenfield et al.
2014/0347463 A1 11/2014 Lin
2014/0353524 A1 12/2014 Danuser et al.
2014/0369586 A1 12/2014 Rimm et al.
2015/0022882 A1 1/2015 Ue et al.
2015/0029508 A1 1/2015 Toyoda et al.
2015/0037806 A1 2/2015 Pollak et al.
2015/0050643 A1 2/2015 Matsumoto et al.
2015/0124082 A1 5/2015 Kato et al.
2015/0183153 A1 7/2015 Chan et al.
2015/0190063 A1 7/2015 Zakharov et al.
2015/0246170 A1 9/2015 Miao et al.
2015/0278575 A1 10/2015 Allano et al.
2015/0302237 A1 10/2015 Ohya et al.
2015/0316477 A1 11/2015 Pollak et al.
2016/0042507 A1 2/2016 Turner
2016/0077007 A1 3/2016 Demos et al.
2016/0091484 A1 3/2016 Yamada
2016/0146750 A1 5/2016 Hughes et al.
2016/0168614 A1 6/2016 Hunt
2016/0187235 A1 6/2016 Fine
2016/0208306 A1 7/2016 Pollak et al.
2016/0246046 A1 8/2016 Yorav-Raphael et al.
2016/0250312 A1 9/2016 Longley
2016/0253466 A1* 9/2016 Agaian .................. G06N 5/043
382/128
2016/0279633 A1 9/2016 Bachelet et al.
2017/0003490 A1 1/2017 Sueki et al.
2017/0052110 A1 2/2017 Malissek et al.
2017/0115271 A1 4/2017 Xie et al.
2017/0146558 A1 5/2017 Ishii et al.
2017/0160185 A1 6/2017 Minemura et al.
2017/0178361 A1 6/2017 Berezhna et al.
2017/0191945 A1 7/2017 Zhang et al.
2017/0205612 A1 7/2017 Carloni
2017/0218425 A1 8/2017 Chen et al.
2017/0292905 A1 10/2017 Obrien et al.
2017/0307496 A1 10/2017 Zahniser et al.
2017/0326549 A1 11/2017 Jones et al.
2017/0328924 A1 11/2017 Jones et al.
2018/0080885 A1 3/2018 Ginsberg et al.
2018/0156713 A1 6/2018 Berezhna et al.
2018/0171404 A1 6/2018 Del Favero et al.
2018/0172578 A1 6/2018 Fiolka
2018/0211380 A1* 7/2018 Tandon .................. G06V 20/69
2018/0246313 A1 8/2018 Eshel et al.
2018/0259318 A1 9/2018 Yelin et al.
2018/0296102 A1 10/2018 Satish et al.
2018/0297024 A1 10/2018 Tran
2019/0002950 A1 1/2019 Pollak et al.
2019/0005684 A1* 1/2019 De Fauw ............... G06V 10/82
2019/0087953 A1 3/2019 (Yorav-Rafael)
2019/0110718 A1 4/2019 Brittenham
2019/0130567 A1 5/2019 Greenfield
2019/0145963 A1 5/2019 Zait et al.
2019/0266723 A1 8/2019 Blanchard et al.
2019/0302099 A1 10/2019 Pollak
2019/0324255 A1 10/2019 Pergande et al.
2019/0347467 A1 11/2019 Ohsaka et al.
2020/0034967 A1 1/2020 (Sdx072)

(56) References Cited

U.S. PATENT DOCUMENTS

| | | | |
|---|---|---|---|
| 2020/0049970 | A1 | 2/2020 | Eshel |
| 2020/0111209 | A1 | 4/2020 | Greenfield |
| 2020/0249458 | A1 | 8/2020 | Eshel |
| 2020/0300750 | A1 | 9/2020 | Eshel |
| 2021/0069696 | A1 | 3/2021 | Li et al. |
| 2022/0189016 | A1 | 6/2022 | Barnes et al. |
| 2023/0028360 | A1 | 1/2023 | Halperin et al. |

FOREIGN PATENT DOCUMENTS

| | | | |
|---|---|---|---|
| CN | 101403650 | A | 4/2009 |
| CN | 101438143 | A | 5/2009 |
| CN | 101501785 | A | 8/2009 |
| CN | 102027368 | A | 4/2011 |
| CN | 102282467 | A | 12/2011 |
| CN | 102933964 | A | 2/2013 |
| CN | 104094118 | A | 10/2014 |
| CN | 104471389 | A | 3/2015 |
| CN | 105467109 | A | 4/2016 |
| CN | 105556276 | A | 5/2016 |
| CN | 107003242 | A | 8/2017 |
| CN | 108474934 | A | 8/2018 |
| CN | 109564209 | A | 4/2019 |
| CN | 109342155 | B | 5/2022 |
| EP | 0073551 | A2 | 3/1983 |
| EP | 0479231 | A1 | 4/1992 |
| EP | 0 744 191 | A2 | 11/1996 |
| EP | 1 381 229 | A1 | 1/2004 |
| EP | 1698883 | A1 | 9/2006 |
| EP | 2145684 | A2 | 1/2010 |
| EP | 2 211 165 | A2 | 7/2010 |
| EP | 3001174 | A1 | 3/2016 |
| EP | 3123927 | | 2/2017 |
| EP | 3482189 | A1 | 5/2019 |
| EP | 1 873 232 | B1 | 2/2020 |
| GB | 2329014 | A | 3/1999 |
| JP | 60-162955 | A | 8/1985 |
| JP | 61-198204 | A | 9/1986 |
| JP | 7-504038 | A | 4/1995 |
| JP | H08-313340 | A | 11/1996 |
| JP | 9-54083 | A | 2/1997 |
| JP | 11-500832 | A | 1/1999 |
| JP | H11-73903 | A | 3/1999 |
| JP | 2000-199845 | A | 7/2000 |
| JP | 2002-516982 | A | 6/2002 |
| JP | 2004-144526 | A | 5/2004 |
| JP | 2004-257768 | A | 9/2004 |
| JP | 2004-532410 | A | 10/2004 |
| JP | 2005-218379 | A | 8/2005 |
| JP | 2006-506607 | A | 2/2006 |
| JP | 2006-301270 | A | 11/2006 |
| JP | 2007-40814 | A | 2/2007 |
| JP | 2008-5768 | A | 1/2008 |
| JP | 2008-20498 | A | 1/2008 |
| JP | 2009-180539 | A | 8/2009 |
| JP | 2009-233927 | A | 10/2009 |
| JP | 2009-268432 | A | 11/2009 |
| JP | 2011-95225 | A | 5/2011 |
| JP | 2013-27368 | A | 2/2013 |
| JP | 2013-515264 | A | 5/2013 |
| JP | 2013-517460 | A | 5/2013 |
| JP | 2013-541767 | A | 11/2013 |
| JP | 2014-41139 | A | 3/2014 |
| JP | 2014-44050 | A | 3/2014 |
| JP | 2015-21938 | A | 2/2015 |
| JP | 2015-57600 | A | 3/2015 |
| JP | 2016-70658 | A | 5/2016 |
| JP | 2016-71588 | A | 5/2016 |
| JP | 2016-528506 | A | 9/2016 |
| JP | 2016-189701 | A | 11/2016 |
| JP | 2017-67524 | A | 4/2017 |
| JP | 2017-209530 | A | 11/2017 |
| JP | 2018-525611 | A | 9/2018 |
| JP | 2018-534605 | A | 11/2018 |
| JP | 2019-528459 | A | 10/2019 |
| JP | 6952683 | B2 | 10/2021 |
| RU | 2 289 133 | C1 | 12/2006 |
| RU | 2402006 | C1 | 10/2010 |
| WO | 1985/005446 | | 12/1985 |
| WO | 1996/001438 | | 1/1996 |
| WO | 1996/012981 | | 5/1996 |
| WO | 1996/013615 | | 5/1996 |
| WO | 2000/006765 | | 2/2000 |
| WO | 2000/052195 | | 9/2000 |
| WO | 2000/055572 | | 9/2000 |
| WO | 2003/056327 | | 7/2003 |
| WO | 2003/065358 | A2 | 8/2003 |
| WO | 2003/073365 | | 9/2003 |
| WO | 2003/081525 | | 10/2003 |
| WO | 2004/020112 | A1 | 3/2004 |
| WO | 2004/111610 | | 12/2004 |
| WO | 2005/121863 | | 12/2005 |
| WO | 2006/121266 | | 11/2006 |
| WO | 2008/063135 | | 5/2008 |
| WO | 2009/136570 | A1 | 11/2009 |
| WO | 2009/136573 | A1 | 11/2009 |
| WO | 2010/036827 | | 4/2010 |
| WO | 2010/056740 | | 5/2010 |
| WO | 2010/116341 | | 10/2010 |
| WO | 2010/126903 | | 11/2010 |
| WO | 2010/137543 | A1 | 12/2010 |
| WO | 2011/056658 | | 5/2011 |
| WO | 2011/076413 | | 6/2011 |
| WO | 2011/123070 | | 10/2011 |
| WO | 2011/143075 | | 11/2011 |
| WO | 2012/000102 | | 1/2012 |
| WO | 2012/029269 | | 3/2012 |
| WO | 2012/030313 | | 3/2012 |
| WO | 2012/090198 | | 7/2012 |
| WO | 2012/154333 | | 11/2012 |
| WO | 2013/041951 | | 3/2013 |
| WO | 2013/098821 | | 7/2013 |
| WO | 2013/102076 | A1 | 7/2013 |
| WO | 2014/146063 | A2 | 9/2014 |
| WO | 2014/159620 | | 10/2014 |
| WO | 2014/188405 | | 11/2014 |
| WO | 2015/001553 | | 1/2015 |
| WO | 2015/029032 | | 3/2015 |
| WO | 2015/089632 | | 6/2015 |
| WO | 2016/021311 | A1 | 2/2016 |
| WO | 2016/030897 | | 3/2016 |
| WO | 2016/141487 | A1 | 9/2016 |
| WO | 2016/203320 | A2 | 12/2016 |
| WO | 2017/046799 | | 3/2017 |
| WO | 2017/168411 | | 10/2017 |
| WO | 2017/195205 | | 11/2017 |
| WO | 2017/195208 | | 11/2017 |
| WO | 2018/009920 | | 1/2018 |
| WO | 2018/102748 | A1 | 6/2018 |
| WO | 2019/035084 | | 2/2019 |
| WO | 2019/097387 | | 5/2019 |
| WO | 2019/102277 | | 5/2019 |
| WO | 2019/118544 | A1 | 6/2019 |
| WO | 2019/198094 | | 10/2019 |
| WO | 2021/079305 | | 4/2021 |
| WO | 2021/079306 | | 4/2021 |
| WO | 2021/116957 | A1 | 6/2021 |
| WO | 2021/116962 | A1 | 6/2021 |
| WO | 2022009104 | A2 | 1/2022 |
| WO | 2024/127207 | A1 | 6/2024 |

OTHER PUBLICATIONS

United States Notice of Allowance issued May 15, 2023 in U.S. Appl. No. 17/490,767.

An Examination Report issued Aug. 16, 2023, in Australian Patent Application No. 2018369859.

Canadian Office Action issued Aug. 25, 2023 in Application No. 3,160,702.

United States Office Action issued May 30, 2023 in U.S. Appl. No. 17/082,615.

A Hearing Notice issued by the Indian Patent Office on Aug. 29, 2023 for IN 201817012117.

(56) References Cited

OTHER PUBLICATIONS

A Hearing Notice issued by the Indian Patent Office on Sep. 1, 2023 for IN 201817036130.
United States Office Action issued Sep. 14, 2023 in U.S. Appl. No. 17/083,647.
United States Office Action issued Sep. 14, 2023 in U.S. Appl. No. 17/063,320.
Office Action dated Dec. 7, 2023 which issued during the prosecution of Canadian Application No. 3,081,669.
A Summons to an Oral Hearing issued by the European Patent Office on Oct. 5, 2023 for Application No. 17728277.9.
A Decision to Refuse issued on Oct. 3, 2023 for Japanese Patent Application No. 2021-157849.
Canadian Office Action issued Oct. 13, 2023 in Application No. 2,998,829.
United States Notice of Allowance issued Oct. 12, 2023 in U.S. Appl. No. 17/568,858.
United States Office Action issued Oct. 17, 2023 in U.S. Appl. No. 17/082,615.
A Hearing Notice issued by the Indian Patent Office on Nov. 9, 2023 for IN 201817040226.
Canadian Office Action issued Dec. 19, 2023 in Application No. 3,018,536.
An Office Action dated Dec. 21, 2023 which issued during the prosecution of Brazilian Application No. 112018 072627 3.
United States Office Action issued Jan. 9, 2024 in U.S. Appl. No. 18/203,109.
"Blood specimens: Microscopic Examination", Centers for Disease Control and Prevention CDC, Diagnostic Procedures, 2009, <http://www.dpd.cdc.gov/dpdx/HTML/Frames/DiagnosticProcedures/body_dp_bloodexamin.htm>.
Agero, U., Mesquita, L.G., Neves, B.R.A., Gazzinelli, R.T. and Mesquita, O.N., 2004. Defocusing microscopy. Microscopy research and technique, 65(3), pp. 159-165.
Ahirwar, Neetu et al., "Advanced Image Analysis Based System for Automatic Detection and Classification of Malarial Parasite in Blood Images, " International Journal of Information Technology and Knowledge Management January-Jun. 2012, vol. 5, No. 1, pp. 59-64, Serial Publications Pvt. Ltd, India.
An International Search Report and a Written Opinion both dated Jan. 23, 2017. which issued during the prosecution of Applicant's PCT/IL2016/051025.
An International Search Report and Written Opinion in International Application No. PCT/IB2018/058861, issued on Apr. 8, 2019.
An International Search Report and Written Opinion, dated Aug. 30, 2017 from the International Bureau in counterpart International application No. PCT/IL2017/050526.
An International Search Report and Written Opinion, dated Aug. 8, 2017 from the International Bureau in counterpart International application No. PCT/IL2017/050523.
An International Search Report and Written Opinion, dated May 18, 2017 from the International Bureau in counterpart International application No. PCT/IL2017/050363.
Anand, A., et al. "Automatic Identification of Malaria-Infected RBC with Digital Holographic Microscopy Using Correlation Algorithms." Photonics Journal, IEEE 4.5 (2012): 1456-1464.
Bacus, J.W., 1985. Cytometric approaches to red blood cells. Pure and Applied AL Chemistry, 57(4), pp. 593-598 ,.
Bieler, Sylvain et al. "Improved detection of Trypanosoma brucei by lysis of red blood cells, concentration and LED fluorescence microscopy"; Acta Tropica; vol. 121, Issue 2, Feb. 2012, pp. 135-140.
Bravo-Zanoguera, M.E., Laris, C.A., Nguyen, L.K., Oliva, M. and Price, J.H., 2007. Dynamic autofocus for continuous-scanning time-delay-and-integration image acquisition in automated microscopy. Journal of biomedical optics, 12(3), p. 034011-034011.
Brenner et al., An Automated Microscope for Cytologic Research a Preliminary Evaluation, [The Journal of Histochecmistry and Cytochemistry, vol. 24, No. 1, pp. 100-111, 1976.
Briggs, C., et al., "Continuing developments with the automated platelet count", Blackwell Publishing Ltd, International Journal of Laboratory Hematology, Jan. 18, 2007, pp. 77-91, vol. 29 (15 p. total).
Centers for Disease Control and Prevention. DPDx—Laboratory Identification of Parasitic Diseases of Public Health Concern <http://www.cdc.gov/dpdx/diagnosticProcedures/blood/microexam.html>, Nov. 29, 2013.
Cervantes, Serena , Jacques Prudhomme, David Carter, Krishna G Gopi, Qian Li, Young-Tae Chang, and Karine G Le Roch, High-content live cell imaging with RNA probes: advancements in high-throughput antimalarial drug discovery, BMC Cell Biology 2009, 10:45, https://bmcmolcellbiol.biomedcentral.com/track/pdf/10.1186/1471-2121-10-45 (Jun. 10, 2009).
Chiodini, p. L et al., "Rapid diagnosis of malaria by fluorescence microscopy"; The Lancet, vol. 337, Issue 8741, P624-625, Mar. 9, 1991.
Chong, Shau Poh, Shilpa Pant, and Nanguang Chen. "Line-scan Focal Modulation Microscopy for Rapid Imaging of Thick Biological Specimens." SPIE/OSA/IEEE Asia Communications and Photonics. International Society for Optics and Photonics, 2011.
Emma Eriksson et al.: "Automated focusing of nuclei for time lapse experiments on single cells using holographic optical tweezers", Optics Express , vol. 17, No., 7 , 2 Mar. 4, 2009, pp. 5585-5594.
F. Boray Tek et al. "Parasite detection and identification for automated thin blood film malaria diagnosis"; Computer Vision and Image Understanding vol. 114, Issue 1, Jan. 2010, pp. 21-32.
Fohlen-Walter, Anne PhD, et al., "Laboratory Identification of Cryoglobulinemia From Automated Blood Cell Counts, Fresh Blood Samples, and Blood Films", American Society for Clinical Pathology, Am J Clin Pathol, 2002, pp. 606-614, vol. 117 (9 p. total).
Frean, John. "Microscopic Determination of Malaria Parasite Load: Role of Image Analysis." Microscopy: Science, technology, Applications, and Education (2010): 862-866.
Gallo, V., Skorokhod, O.A., Schwarzer, e, AND Arese, P. " Simultaneous determination of phagocytosis of Plasmodium falciparum-parasitized and non-parasitized red blood cells by flow cytometry"; Malaria Journal 2012 11:428.
Garcia, et al. "Laboratory Diagnosis of Blood-borne Parasitic Diseases; Approved Guideline"; Nccls Documents M115-a, Jun. 2000.
Gordon, Andrew et al. "Single-cell quantification of molecules" Nature Methods 4, Jan. 21, 2007, pp. 175-181.
Gordon, Andrew et al. Supplementary Note to Gordon et al.: "Single-cell quantification of molecules" Nature Methods, Jan. 21, 2007, pp. 1-35.
Groen, F.C.A., et al. "A comparison of different focus functions for use in autofocus algorithms", Cytometry, Alan Liss, New York, US vol. 6, No. 2, Mar. 1, 1985 (1985-03-01) pp. 81-91.
Guy, Rebecca, Paul Liu, Peter Pennefather and lan Crandall, "The use of fluorescence enhancement to improve the microscopic diagnosis of falciparum malaria", Malaria Journal 2007 6:89, https://malariajournal.biomedcentral.com/articles/10.1186/1475-2875-6-89, (2007/07/09).
Houri-Yafin, A., et al. "An enhanced computer vision platform for clinical diagnosis of malaria" Malaria Control and Elimination, 2016, page138, Vo. 5, Issue 1, omics International, India.
Jager et al. "Five-minute Giemsa stain for rapid detection of malaria parasites in blood smears", Tropical Doctor, Vo. 41, pp. 33-35, Jan. 2011.
Jahanmehr, S a H et al., " Simple Technique for Fluorescence Staining of Blood Cells with Acridine Orange", Journal of Clinical Pathology, Feb. 12, 1987, pp. 926-929 (4 p. total).
Joanny, Fanny, Helda Jana, and Benjamin Mordmllera, "In Vitro Activity of Fluorescent Dyes against Asexual Blood Stages of Plasmodium falciparum"DOI: 10.1128/AAC.00709-12.
Kawamoto, F. and P.F.Billingsley, "Rapid diagnosis of malaria by fluorescence microscopy", Parasitology Today, 8.2 (1992): 69-71.
Kawamoto, F. " Rapid diagnosis of malaria by fluorescence microscopy with light microscope and interference filter", The Lancet, vol. 337, pp. 200-202, Jan. 26, 1991.
Keiser, J et al., "Acridine Orange for malaria diagnosis: its diagnostic performance, its promotion and implementation in Tanzania,

(56) References Cited

OTHER PUBLICATIONS and the implications for malaria control", Annals of Tropical Medicine and parasitology, 96.7 (2002): 643-654.
Knesel, "Roche Image Analysis Systems, Inc.", Acta Cytologica, vol. 40, pp. 60-66, (1996).
Kumar, Amit et al. " Enhanced Identification of Malarial Infected Objects using Otsu Algorithm from Thin Smear Digital Images." International Journal of Latest Research in Science and Technology vol. 1, Issue 2 :pp. 159-163, July-Aug. 2012).
Le, Minh-Tam et al., "A novel semi-automatic image processing approach to determine Plasmodium falciparum parasitemia in Giemsa-stained thin blood smears", BMC Cell Biology, published Mar. 28, 2008.
Leif, "Methods for Preparing Sorted Cells as Monolayer Specimens", Springer Lab Manuals, Section 7 - Chapter 5 pp. 592-619, (2000).
Life Technologies Corporation, "Counting blood cells with Countless Automated Cell Counter" found at http://www.lifetechnologies.com/content/dam/Life Tech/migration/files/cell-tissue- analysis/pdfs.par.83996.file.dat/w-082149-countless-application-blood-cells.pdf, four pages, (2009).
Matcher, S.J., et al. "Use of the water absorption spectrum to quantify tissue chromophore concentration changes in near-infrared spectroscopy", Physics in Medicine & Biology, vol. 39, No. 1, 1994 pp. 177-196, IOP Publishing Ltd., UK.
Mendiratta, D.K et al. Evaluation of different methods for diagnosis of P. falciparum malaria; Indian J Med Microbiol. Jan. 2006;24(1):49-51.
Merchant et al. , "Computer-Assisted Microscopy", The essential guide to image processing, Chapter 27, pp. 777-831, Academic Press, (2009).
Moody , "Rapid Diagnostic Tests for Malaria Parasites", Clinical Microbiology Reviews, vol. 15, No. 1, pp. 66-78, 12 (2002).
Moon S, Lee S, Kim H, Freitas-Junior LH, Kang M, Ayong L, et al. (2013) An Image Analysis Algorithm for Malaria Parasite Stage Classification and Viability Quantification. Plos One 8(4): e61812. https://doi.org/10.1371/journal.pone.0061812.
Ortyn, William E., et al. "Extended Depth of Field Imaging for High Speed Cell Analysis." Cytometry Part A 71.4, 2007): 215-231.
Osibote, O. A., et al. "Automated focusing in bright-field microscopy for tuberculosis detection", Journal of Microscopy 240.2 (2010)pp. 155-163.
Pasini, Erica M et al. "A novel live-dead staining methodology to study malaria parasite viability"; Malaria Journal 2013 12:190.
Piruska, Aigars et al., "The autofluorescence of plastic materials and chips measured under laser irradiation" Lab on a Chip, 2005, 5, 1348-1354, published Nov. 1, 2005.
Poon et al., "Automated Image Detection and Segmentation in Blood Smears", [Cytometry 1992 13:766- 774].
Purwar, Yashasvi, et al. "Automated and Unsupervised Detection of Malarial Parasites in Microscopic Images." Malaria Journal 10.1 (2011): 364.
Rappaz, Benjamin et al., "Comparative study of human erythrocytes by digital holographic microscopy, confocal microscopy, and impedance vol. analyzer" Cytometry Part A, 2008, vol. 73, Issue 10, pp. 895-903, John Wiley & Sons, US.
Roma, P. M. S., et al. "Total three-dimensional imaging of phase objects using defocusing microscopy: Application to red blood cells." Applied Physics Letters 104,25 (2014): 251107.
Ross, Nichoals E., et al., "Automated image processing method for the diagnosis and classification of malaria on thin blood smears", Medical and Biological Engineering and Computing, May 2006, vol. 44, Issue 5, pp. 427-436, Springer Publishing Company, US.
Sheikh , H., Bin Zhu, Micheli-Tzanakou, E. (1996) "Blood cell identification using neural networks." Proceedings of the IEEE 22nd Annual Northeast Bioengineering Conference; pp. 119-120.
Shen, Feimo, Louis Hodgson and Klaus Hahn, "Digital autofocus method for automated microscopy", Methods in Enzymology vol. 414, 2006, pp. 620-632.
Shute G. T. and T. M. Sodeman, " Identification of malaria parasites by fluorescence microscopy and acridine orange staining", Bulletin of the World Health Organ. 1973; 48(5): 591-596.
Sun, Yu, S. Duthaler and B.J. Nelson, "Autofocusing algorithm selection in computer microscopy", 2005 IEEE/RSJ International Conference on Intelligent Robots and Systems.
Tek, F. Boray, Andrew G. Dempster, and Izzet Kale. "Computer Vision for Microscopy Diagnosis of Malaria." Malaria Journal 8.1 (2009): 153.
Thung, Ferdian, and Iping Supriana Suwardi. "Blood Parasite Identification Using Feature Based Recognition." Electrical Engineering and Informatics (ICEEI), 2011 International Conference on. IEEE, 2011.
U.S. Provisional U.S. Appl. No. 61/427,809 file Dec. 29, 2010. (CAT-1).
U.S. Provisional Patent Application No. 61/870, 106 filed Aug. 26, 2013. (CAT-2).
U.S. Provisional U.S. Appl. No. 62/042,388, filed Aug. 27, 2014 (CAT-2).
UNITAID Malaria Diagnostic Technology And Market Landscape, 2nd Edition (2014).
Wissing, Frank et al. "Illumination of the Malaria Parasite Plasmodium falciparum Alters Intracellular pH", Implications for Live Cell Imaging; published Jul. 24, 2002, JBS Papers in Press, vol. 277 No. 40, p. 27747-37755.
Wright, J H. "A Rapid Method for the Differential Staining of Blood Films and Malarial Parasites" Journal of medical research vol. 7,1 (1902): 138-44.
Wu, Caicai et al., "Feasibility study of the spectroscopic measurement of oxyhemoglobin using whole blood without pre-treatment", The Analyst, Mar. 1998, pp. 477-481, vol. 123 (5 p. total).
Wu, Qiang, Fatima Mechant, and Kenneth Castleman. Microscope Image Processing. Chapter 16, Autofocusing, pp. 441-467, Academic Press, 2010.
Xu, Lili, Asok Chaudhuri, "Plasmodium yoelii: A differential fluorescent technique using Acridine Orange to identify infected erythrocytes and reticulocytes in Duffy knockout mouse", Experimental Parasitology, vol. 110, Issue 1, May 2005, pp. 80-87, https://www.sciencedirect.com/science/article/pii/S001448940500038X, (2005/05/31).
Yang, Ming, and Li Luo. "A Rapid Auto-Focus Method in Automatic Microscope." Signal Processing, 2008. ICSP 2008. 9th International Conference on. IEEE,2008.
Yao, LN et al. "Pathogen identification and clinical diagnosis for one case infected with Babesia". Zhongguo ji sheng chong xue yu ji sheng chong bing za zhi Chinese journal of parasitology parasitic diseases, Aug. 2012.
Yazdanfar, S., Kenny, K.B., Tasimi, K., Corwin, A.D., Dixon, E.L. and Filkins, R.J., 2008. Simple and robust image-based autofocusing for digital microscopy. Optics express, 16(12), pp. 8670-8677,.
Zahniser et al., Automated Slide Preparation System for the Clinical Laboratory, Cytometry, vol. 26, No. 10, pp. 60-64, (1996).
A European Examination Report dated Dec. 9, 2019. which issued during the prosecution of Applicant's European App No. 16782094.3.
Notice of Allowance dated Mar. 2, 2020, which issued during the prosecution of U.S. Appl. No. 16/657,473.
A European Examination Report dated Feb. 1, 2019. which issued during the prosecution of Applicant's European App No. 17717000.8.
A European Examination Report dated Sep. 3, 2019. which issued during the prosecution of Applicant's European App No. 17717000.8.
A European Examination Report dated Apr. 8, 2020. which issued during the prosecution of Applicant's European App No. 17717000.8.
A European Examination Report dated Apr. 6, 2020. which issued during the prosecution of Applicant's European App No. 17726036.1.
A European Examination Report dated Feb. 11, 2020. which issued during the prosecution of Applicant's European App No. 17728277.9.
An Office Action dated Aug. 24, 2020 for U.S. Appl. No. 16/098,893.

(56) References Cited

OTHER PUBLICATIONS

A Chinese Office Action and dated May 22, 2020. which issued during the prosecution of Chinese Application No. 201680053431.1.
A Restriction Requirement issued by the USPTO on Aug. 24, 2020 for U.S. Appl. No. 16/088,321.
Saraswat, et al. "Automated microscopic image analysis for leukocytes identification: A survey", ABV- Indian Institute of Information Technology and Management, Gwalior, India.
Hiremath, P.S, et al., "Automated Identification and Classification of White Blood Cells (Leukocytes) in Digital Microscopic Images", IJCA Special Issue on "Recent Trends in Image Processing and Pattern Recognition" RTIPPR, 2010.
Witt, et al. "Establishing traceability of photometric absorbance values for accurate measurements of the haemoglobin concentration in blood.", Metrologia 50 (2013) 539-548.
Putzu, et al., "Leucocyte classification for leukaemia detection using image processing techniques.", Artificial Intelligence in Medicine, vol. 63, No. 3, Nov. 1, 2014.
Varga, et al., "An automated scoring procedure for the micronucleus test by image analysis, ", Mutagenesis vol. 19 no. 5 p. 391 -- 397, 2004.
Ran, Qiong et al. "Spatial-spectral blood cell classification with microscopic hyperspectral imagery", Proc. SPIE 10461, AOPC 2017: Optical Spectroscopy and Imaging, 1046102 (Oct. 24, 2017).
Omucheni et al. "Application of principal component analysis to multispectral-multimodal optical image analysis for malaria diagnostics", Malaria Journal 2014, 13:485 http://www.malariajournal.com/content/13/1/485.
Ben-Suliman-2018-Computerized Counting-Based System for Acute Lymphoblastic Leukemia Detection in Microscopic Blood Images: 27th International Conference on Artificial Neural Networks, Rhodes, Greece, Oct. 4-7, 2018, Proceedings, Part II.
An Office Action dated Dec. 8, 2020 for Japanese Patent Application No. 2018/512961.
An Examination Report issued on Dec. 7, 2020 for Australian Patent Application No. 2016322966.
An Office Action dated Jan. 11, 2021 for U.S. Appl. No. 16/098,893.
An Examination Report issued on Apr. 29, 2021 for Australian Patent Application No. 2016322966.
International Search Report issued for PCT Application No. PCT/IB2020/059924 on Mar. 22, 2021.
International Search Report issued for PCT Application No. PCT/IB2020/059925 on Mar. 26, 2021.
Invitation to pay fees and Partial Search Report issued for PCT Application No. PCT/IB2020/059924 on Jan. 28, 2021.
Invitation to pay fees and Partial Search Report issued for PCT Application No. PCT/IB2020/059925 on Feb. 4, 2021.
A Japanese Office Action dated Mar. 30, 2021. which issued during the prosecution of Application No. 2018/558180.
An Office Action dated Mar. 9, 2021 for U.S. Appl. No. 16/088,321.
An Office Action dated Jan. 29, 2021 for U.S. Appl. No. 16/099,270.
Bovik, Alan C., et. "The Essential Guide to Image Processing", Chapter 27, "Computer Assisted Microscopy", pp. 777-831; Academic Press, 2009 (MERCHANT).
Communication dated Nov. 18, 2014 from the Canadian Patent Office in application No. 2,655,024.
Laboratory diagnosis of blood-bome parasitic diseases: approved guideline, 2000 - Nccls (CAT-1).
Price Jeffrey H. and David A. Gough, "Comparison of phase-contrast and fluorescence digital autofocus for scanning microscopy", Cytometry 16.4 (1994) 283-297.
Vink, J.P et al., "An automatic vision-based malaria diagnosis system", Journal of Microscopy 250.3 (2013):166-178.
An International Search Report and Written Opinion for Application No. PCT/IB2020/061731 issued on Feb. 22, 2021.
Invitation to pay fees and Partial Search Report issued for PCT Application No. PCT/IB2020/061732 on Mar. 10, 2021.
Invitation to pay fees and Partial Search Report issued for PCT Application No. PCT/IB2020/061736 on Mar. 12, 2021.
Invitation to pay fees and Partial Search Report issued for PCT Application No. PCT/IB2020/061728 on Mar. 15, 2021.
International Search Report issued for PCT Application No. PCT/IB2020/061724 on Mar. 10, 2021.
An International Search Report and Written Opinion for PCT Application No. PCT/IB2020/061732 mailed on May 7, 2021.
International Search Report and Written Opinion for PCT Application No. PCT/IB2020/061728 mailed on May 7, 2021.
International Search Report and Written Opinion for PCT Application No. PCT/IB2020/061736 mailed on May 3, 2021.
Non-Final Office Action dated Jun. 17, 2021 which issued during the prosecution of U.S. Appl. No. 16/851,410.
A Final Office Action dated Jun. 17, 2021 which issued during the prosecution of U.S. Appl. No. 16/088,321.
Notice of Allowance dated May 19, 2021 which issued during the prosecution of U.S. Appl. No. 16/099,270.
A Restriction Requirement issued by the USPTO on Oct. 19, 2020 for U.S. Appl. No. 16/099,270.
An Extended European Search Report issued for European Patent Application No. 21164814.2 on Jun. 9, 2021.
Third Office Action dated Jul. 12, 2021 which issued during the prosecution of Chinese Patent Application No. 201680053431.1.
Non-Final Office Action dated Jul. 27, 2021, which issued during the prosecution of U.S. Appl. No. 16/851,686.
Non-Final Office Action dated Aug. 19, 2021, which issued during the prosecution of U.S. Appl. No. 16/098,893.
Non-Final Office Action dated Sep. 1, 2021 which issued during the prosecution of U.S. Appl. No. 16/088,321.
First Office Action dated Aug. 4, 2021 which issued during the prosecution of Chinese Patent Application No. 201780027908.3.
An Examination Report dated Mar. 4, 2021 which issued during the prosecution of Indian Patent Application No. 201817036130.
An Examination Report dated May 5, 2021 which issued during the prosecution of Indian Patent Application No. 201817012117.
Non-Final Office Action dated Oct. 6, 2021, which issued during the prosecution of U.S. Appl. No. 17/063,320.
Notice of Allowance dated Aug. 3, 2021, which issued during the prosecution of U.S. Appl. No. 16/851,410.
Notice of Allowance dated Nov. 5, 2021, which issued during the prosecution of U.S. Appl. No. 16/851,410.
Notice of Allowance dated Nov. 10, 2021, which issued during the prosecution of U.S. Appl. No. 16/851,686.
Supplemental Notice of Allowance dated Nov. 12, 2021, which issued during the prosecution of U.S. Appl. No. 16/851,686.
A European Examination Report issued for European Patent Application No. 17728277.9 on Dec. 23, 2021.
Notice of Allowance dated Jan. 21, 2022, which issued during the prosecution of U.S. Appl. No. 16/098,893.
An Office Action dated Feb. 16, 2022 which issued during the prosecution of U.S. Appl. No. 16/088,321.
An Office Action dated May 6, 2022 which issued during the prosecution of U.S. Appl. No. 16/763,810.
A Non-Final Office Action dated May 26, 2022 which issued during the prosecution of US Patent Application No. 17/083, 775.
An Office Action dated May 31, 2022 which issued during the prosecution of U.S. Appl. No. 17/083,659.
Examination Report issued by the Indian Patent Office on Jun. 28, 2022 in Indian Patent Application No. 202047019700.
Communication dated Feb. 22, 2023 issued by the Canadian Patent Office in application No. 3,081,669.
Communication dated Jul. 12, 2023 issued by the Canadian Patent Office in application No. 3,155,820.
Communication dated Jul. 17, 2023 issued by the Canadian Patent Office in application No. 3,155,821.
Communication dated Jul. 3, 2023 issued by the United States Patent and Trademark Office in U.S. Appl. No. 17/568,858.
Communication dated Jun. 22, 2023 issued by the Canadian Office Action in application No. 3, 160,697.
Communication dated Jun. 8, 2023, issued by the Canadian Patent Office in application No. 3, 160,692.
Communication dated Jun. 9, 2023 issued by the Canadian Patent Office in application No. 3, 160,688.

(56) References Cited

OTHER PUBLICATIONS

Communication dated Mar. 17, 2023 issued by the United States Patent and Trademark Office in U.S. Appl. No. 17/083,647.
Communication dated Mar. 2, 2023 issued in the Canadian Patent Office in application No. 3,018,536.
Communication dated Mar. 20, 2023 issued by the European Patent Office in application No. 22209948.3.
Communication dated Mar. 27, 2023 issued by the Brazilian Patent Office in application No. BR122020017765-9.
Communication dated Mar. 27, 2023 issued by the United States Patent and Trademark Office in U.S. Appl. No. 16/763,810.
Communication dated Mar. 3, 2022 issued by the United States Patent and Trademark Office in U.S. Appl. No. 17/063,320.
Communication dated Mar. 3, 2023 issued by the United States Patent and Trademark Office in U.S. Appl. No. 17/082,483.
Communication dated Mar. 7, 2023 issued by the Japanese Patent Office in application No. 2021- 157849.
Communication dated Nov. 25, 2022 issued by the United States Patent and Trademark Office in U.S. Appl. No. 17/082,483.
Hirota, T., et al., "Kusanon AR Poisoning Complicated by Heinz Body Hemolytic Anemia", Japanese Association for Acute Medicine Magazine, vol. 12, No. 12, Dec. 15, 2001, (1 page total).
Notice of Allowance dated Apr. 12, 2023 issued by the United States Patent and Trademark Office in U.S. Appl. No. 16/088,321.
Onodera, M., "Organ Derangement", Medicina, Sep. 9, 2005, vol. 42, No. 9, pp. 1582-1584 (5 p. total).
Sawhney, A.K., et al., "Erythrocyte Alterations Induced by Malathion in Channa punctatus (Bloch)", Bull. Environ. Contam. Toxicol., 2000, vol. 64, pp. 395-405.
Takakusaki, T., "Shape Change of Red Cell Ghost and ATP", The KITAKANTO Medical Journal, 1960, vol. 10, Issue 4, pp. 522-531 (11 p. total).
Tyulina, O., et al., "Erythrocyte and plasma protein modification in alcoholism: A possible role of acctaldehyde", Biochimica et Biophysica Acta, vol. 1762, 2006, pp. 558-563 (6 p. total).
An Office Action dated Jul. 12, 2022, which issued during the prosecution of U.S. Appl. No. 16/088,321.
An Office Action dated Aug. 2, 2022, which issued during the prosecution of Japanese Patent Application No. 2021-145455.
An Examination Report dated Aug. 25, 2022, which issued during the prosecution of Australian Patent Application No. 2017263807.
An Office Action dated Aug. 30, 2022 which issued during the prosecution of Japanese Patent Application No. 2020-526176.
An Office Action dated Sep. 13, 2022 which issued during the prosecution of Japanese Patent Application No. 2021-157849.
Hideto Miura, "How to regard as how to consider the poikilocyte in urine an erroneous decision factor", Modern Medical Laboratory, Sep. 1, 2002, vol. 30, No. 9, pp. 862-864 (6 p. total).
Jun Hashimoto, "Morphological Studies of Urinary Red Blood Cells in Renal and Urinary Tract Disorders (II) Use of Wright's Stain in Differential Diagnosis between Renal and Urinary Tract Disorders" Kawasaki Medical Congress Magazine, Mar. 1989, vol. 15, No. 1, pp. 94-101 (9 p. total).
D F Birch et al., "The research on the differential diagnosis of the kidney urinary tract obstacle by glomerular or non-glomerular", Lancet, Oct. 20, 1979, vol. 2, No. 8147, pp. 845-846 (3 p. total).
A First Examination Report dated Sep. 19, 2022, which issued during the prosecution of Indian Patent Application No. 201817040226.
An Office Action dated Oct. 3, 2022 which issued during the prosecution of U.S. Appl. No. 16/763,810.
An Office Action dated Oct. 25, 2022 which issued during the prosecution of Canadian Application No. 2,998,829 (SDX044).
An Office Action dated Oct. 5, 2022 which issued during the prosecution of Brazilian Application No. 112018005099-7.
An Office Action dated Nov. 25, 2022 which issued during the prosecution of Brazilian Application No. 122020017765-9.
An Office Action dated Dec. 9, 2022 which issued during the prosecution of United States U.S. Appl. No. 17/083,647.
An Office Action dated Dec. 28, 2022 which issued during the prosecution of Russian Patent Application No. 2022112399.
An Office Action dated Dec. 28, 2022 which issued during the prosecution of Russian Patent Application No. 2022112393.
An Office Action dated Jan. 6, 2023 which issued during the prosecution of U.S. Appl. No. 17/063,320.
An Office Action dated Sep. 2, 2022 which issued during the prosecution of U.S. Appl. No. 17/063,320.
An Office Action dated Jan. 5, 2023 which issued during the prosecution of Chinese Patent Application No. 201880079888.9.
An Examination Report dated Jan. 23, 2023, which issued during the prosecution of Australian Patent Application No. 2022200112.
An Office Action dated Jan. 19, 2023 which issued during the prosecution of U.S. Appl. No. 17/490,767.
Bonnekoh, Bernd, et al. "Profiling lymphocyte subpopulations in peripheral blood under efalizumab treatment of psoriasis by multi epitope ligand cartography (MELC) robot microscopy", European Journal of Dermatology, 2006, vol. 16 No. 6 (3 pages).
Chinese Office Action dated Feb. 27, 2025 which issued during the prosecution of Application No. 202080085933.9.
Chinese Office Action dated Jan. 27, 2025 which issued during the prosecution of Application No. 202080085480.X.
Chinese Office Action dated May 23, 2024 which issued during the prosecution of Application No. 202080073583.4.
Chinese Office Action dated May 14, 2025 which issued during the prosecution of Application No. 202080085933.9.
Chinese Office Action dated May 23, 2024 which issued during the prosecution of Application No. 202080073623.5.
Chinese Office Action dated Nov. 25, 2024 which issued during the prosecution of Application No. 202080073583.4.
Chinese Office Action dated Nov. 25, 2024 which issued during the prosecution of Application No. 202080073623.5.
Combined Search and Examination Report issued for European Application No. 20828313.5 on Sep. 11, 2024.
European Examination Report dated Jun. 13, 2025. which issued during the prosecution of Applicant's European App No. 22209948. 3.
Examination Report dated Jan. 23, 2025 which issued during the prosecution of New Zealand Application No. 787745.
Examination Report dated Jul. 15, 2025, which issued during the prosecution of Australian Patent Application No. 2020370212.
Examination Report dated Jul. 15, 2025, which issued during the prosecution of Australian Patent Application No. 2020400353.
Examination Report dated Jul. 28, 2025, which issued during the prosecution of Australian Patent Application No. 2020402284.
Examination Report dated Oct. 23, 2024 which issued during the prosecution of European Application No. 20828312.7.
Examination Report dated Oct. 23, 2024 which issued during the prosecution of New Zealand Application No. 787745.
Examination Report dated Oct. 31, 2024 which issued during the prosecution of New Zealand Application No. 787743.
Final Office Action dated Dec. 19, 2024, which issued during the prosecution of U.S. Appl. No. 17/063,320.
Final Office Action dated Dec. 30, 2024, which issued during the prosecution of U.S. Appl. No. 17/083,647.
Final Office Action dated for United States U.S. Appl. No. 17/770,365 dated Apr. 28, 2025.
Final Office Action dated May 20, 2025, which issued during the prosecution of U.S. Appl. No. 17/083,647.
First Office Action for Chinese Application No. 202111613655.2 dated May 8, 2025.
First Office Action for Chinese Application No. 202210483679.9 dated Apr. 30, 2025.
Haroon Hussain et al., "Hide and seek: hematological aspects of malaria a developing country perspective", J Infect DevCitries, 2013, vol. 7, No. 3, pp. 273-279 (7 pages).
Horton, A. P., K. Kumar, H. Liu, L. Cheng, N. Lane, E. Taylor, H. R. Garner, J. W. Uhr, and X. J. Zhang. "Quantitative immunophenotyping of circulating tumor cells in blood using microfluidic screening chip integrated with hyperspectral microscope." In TRANSDUCERS 2009 International Solid-State Sensors, Actuators and Microsystems Conference, pp. 77-80. IEEE, 2009 (4 pages).
International Search Report and Written Opinion issued for PCT Application No. PCT/IB2024/054798 on Sep. 2, 2024.

(56) References Cited

OTHER PUBLICATIONS

Invitation to Pay Additional Search Fees issued on Jul. 10, 2024 by the WIPO for PCT/IB2024/054798.
Japanese Office Action dated Jan. 14, 2025 which issued during the prosecution of Application No. 2024-015207.
Japanese Office Action dated Jul. 1, 2024 which issued during the prosecution of Application No. 2022-521112.
Japanese Office Action dated Jul. 3, 2024 which issued during the prosecution of Application No. 2022-521238.
Japanese Office Action dated Nov. 5, 2024 which issued during the prosecution of Application No. 2022- 534369.
Japanese Office Action dated Nov. 11, 2024 which issued during the prosecution of Application No. 2022- 521238.
Japanese Office Action dated Nov. 7, 2024 which issued during the prosecution of Application No. 2022- 521112.
Niehues T, et al.. "A classification based on T cell selection-related phenotypes identifies a subgroup of childhood T- All with favorable outcome in the COALL studies", Leukemia. Apr. 1999, vol. 13, pp. 614-617 (4 pages).
Non-Final Office Action dated Jul. 8, 2024 which issued during the prosecution of U.S. Appl. No. 18/397,324.
Non-Final Office Action dated Sep. 28, 2024 which issued during the prosecution of U.S. Appl. No. 17/770,339.
Notice of Allowance dated Aug. 7, 2024, which issued during the prosecution of U.S. Appl. No. 17/783,924.
Notice of Allowance dated Jun. 24, 2025 which issued during the prosecution of U.S. Appl. No. 17/783,930.
Notice of Allowance dated Mar. 8, 2024, which issued during the prosecution of U.S. Appl. No. 17/082,615.
Notice of Allowance dated Sep. 23, 2024, which issued during the prosecution of U.S. Appl. No. 18/203,109.
Notice of Allowance for United States U.S. Appl. No. 17/063,320 on Apr. 21, 2025.
Notice of Allowance issued for U.S. Application No. 18/203, 109 on Jun. 13, 2024.
Novelli, Enrico M., et al. "Clinical predictors of severe malarial anaemia in a holoendemic Plasmodium falciparum transmission area." British journal of haematology, 2010, vol. 149, No. 5, pp. 711-721 (12 pages).
Office Action dated Aug. 15, 2024 which issued during the prosecution of United States U.S. Appl. No. 17/083,647.
Office Action dated Aug. 5, 2025, which issued during the prosecution of Brazilian Application No. 112018 072627 3.
Office Action dated Jan. 13, 2025 which issued during the prosecution of United States U.S. Appl. No. 17/770,365.
Office Action dated Jan. 15, 2025 which issued during the prosecution of United States U.S. Appl. No. 17/836,561.
Office Action dated Jul. 1, 2025 which issued during the prosecution of United States U.S. Appl. No. 17/783,831.
Office Action dated Jun. 16, 2025 which issued during the prosecution of Canadian Application No. 3,160,692.
Office Action dated Mar. 13, 2025 which issued during the prosecution of United States U.S. Appl. No. 17/783,831.
Office Action dated Mar. 5, 2025 which issued during the prosecution of Japanese Patent Application No. 2022- 534230.
Office Action dated Oct. 3, 2024 which issued during the prosecution of Japanese Patent Application No. 2022- 534230.
Office Action dated Oct. 7, 2024 which issued during the prosecution of Japanese Patent Application No. 2022- 534229.
Office Action dated Sep. 3, 2024 which issued during the prosecution of Canadian Patent Application No. 3,081,669.
Philip E. Thuma, et al., "Distinct Clinical and Immunologic Profiles in Severe Malarial Anemia and Cerebral Malaria in Zambia", The Journal of Infectious Diseases, vol. 203, Issue 2, Jan. 15, 2011, pp. 211-219 (10 pages).
Restriction Requirement dated Jun. 17, 2025 which issued during the prosecution of U.S. Appl. No. 17/783,839.
Notice of Allowance issued for U.S. Appl. No. 16/763,810 on Feb. 8, 2024.
United States Office Action dated Feb. 29, 2024 in U.S. Appl. No. 17/083,647.
Canadian Office Action dated Jan. 12, 2023 in Application No. 3022770.
Canadian Office Action dated Mar. 4, 2024 in Application No. 3022770.
International Search Report and Written Opinion dated Mar. 11, 2024 in Application No. PCT/IB2023/062469.
Canadian Office Action dated Mar. 11, 2024 in Application No. 3160692.
Canadian Office Action dated Mar. 6, 2024 in Application No. 3160688.
United States Office Action dated Mar. 22, 2024 in U.S. Appl. No. 17/360,503.
Canadian Office Action dated Apr. 3, 2024 in Application No. 3160697.
Canadian Office Action dated Apr. 19, 2024 in Application No. 3155820.
New Zealand Office Action dated Apr. 23, 2024 in Application No. 787743.
New Zealand Office Action dated Apr. 24, 2024 in Application No. 787745.
European Office Action dated Apr. 29, 2024 in Application No. 20800326.9.
European Office Action dated May 6, 2024 in Application No. 20 800 325.1.
United States Office Action dated May 7, 2024 in U.S. Appl. No. 17/770,339.
Kerem DELIKOYUN, et al., "2 Deep learning-based cellular image analysis for intelligent medical diagnosis" , De Gruyter, 2021, (4 pages) https://www.degruyter.com/document/doi/10.1515/9783110668322-002/html.
C.Briggs, et al., "ICSH Guidelines for the evaluation of blood cell analysers including those used for differential leucocyte and reticulocyte counting", International Journal of Laboratory Hematology, 2014, vol. 36, pp. 613-627 (15 pages).
An Office Action dated May 16, 2024 which issued during the prosecution of U.S. Appl. No. 17/063,320.
Notice of Allowance issued for Canadian Application No. 3,155,821 on May 21, 2024.
An Office Action dated May 29, 2024 which issued during the prosecution of Korean Application No. 10- 2022-7017082.
An Office Action dated May 29, 2024 which issued during the prosecution of Korean Application No. 10- 2022-7017081.
A Chinese Office Action dated May 9, 2024 which issued during the prosecution of Application No. 202080085933.9.
European Office Action dated May 8, 2024 in Application No. 20828314.3.
European Examination Report dated Nov. 4, 2025 which issued during the prosecution of Application No. 20800326.9.
Examination Report dated Oct. 29, 2025, which issued during the prosecution of Australian Patent Application No. 2020372024.
Examination Report dated Oct. 30, 2025, which issued during the prosecution of Australian Patent Application No. 2020402284.
Examination Report dated Sep. 25, 2025, which issued during the prosecution of Australian Patent Application No. 2020403242.
First Examination Report for Indian Application No. 202247017064 issued on Aug. 29, 2025.
Harris, et al., "Generating suspended cell monolayers for mechanobiological studies" Nature Protocols, 2013, vol. 8, No. 12, pp. 2516-2530 (15 pages).
Indian Examination Report dated Dec. 3, 2025, which issued during the prosecution of Indian App No. 202247017066.
Isiksacan, et al., "A portable microfluidic system for rapid measurement of the erythrocyte sedimentation rate", Lab on a Chip, 2016, vol. 16, No. 24, pp. 4682-4690 (10 pages).
First Examination Report for Indian Application No. 202247029412 issued on Nov. 11, 2025.
Kratz, et al., "Digital morphology analyzers in hematology: ICSH review and recommendations", International Journal of Laboratory Hematology, 2019, vol. 41, pp. 437-447.
Non-Final Office Action dated Nov. 19, 2025 which issued during the prosecution of United States U.S. Appl. No. 17/783,831.

(56) References Cited

OTHER PUBLICATIONS

Sharkey, et al., "In-Clinic Hematology: The Blood Film Review", Today's Veterinary Practice, tvpjournal.com, July/Aug. 2015, pp. 43-53 (8 pages).
Storms, et al., "Hoechst dye efflux reveals a novel CD7+CD34- lymphoid progenitor in human umbilical cord blood", Blood, The Journal of the American Society of Hematology, Sep. 15, 2000, vol. 96, No. 6, pp. 2125-2133.
Notice of Allowance for U.S. Appl. No. 17/783,930 dated Sep. 10, 2025.
Weber et al., "Variable Pathlength Fiber-Optic Spectrophotometry for Protein Determination in Immunoglobulin Concentrates," BioPharm International, vol. 28, No. 12, 2015, pp. 42-50 (15 pages).
Written Opinion issued by the Singapore Patent Application No. 11202204191X on Sep. 24, 2025.
Written Opinion issued by the Singapore Patent Application No. 11202204201Y on Oct. 4, 2025.
Examination Report dated Dec. 9, 2025, which issued during the prosecution of Australian Patent Application No. 2020400400.
First Examination Report for Indian Application No. 202247029574 issued on Dec. 12, 2025.
Das, D. K et al. "Automated identification of normoblast cell from human peripheral blood smear images", Journal of Microscopy, 2017, vol. 269, No. 3, pp. 1-11.
Non-Final Office Action dated Dec. 23, 2025 which issued during the prosecution of United States U.S. Appl. No. 18/415,961.
Sharkey, Leslie C. "In Hospital Hematology: How to Save a Life with a Blood Smear." College of Veterinary Medicine, University of Minnesota, St Paul, MN, Downloaded from https://cabidigitallibrary.org on Dec. 15, 2025, 4 pages.
First Examination Report for Indian Application No. 202247029834 issued on Jan. 6, 2026.
Sintorn et al. "Gradient based intensity normalization" Journal of Microscopy, vol. 240, No. 3, 2010, pp. 249-258.
Non-Final Office Action dated Jan. 12, 2026 which issued during the prosecution of United States U.S. Appl. No. 17/770,365.
Preliminary Office Action for Brazilian Patent Application No. 11 2022 011354 4 issued on Jan. 21, 2026.
Preliminary Office Action for Brazilian Patent Application No. 11 2022 011255 6 issued on Jan. 21, 2026.

* cited by examiner

DETERMINE HIGH PLATELET CONCENTRATION
130
DERIVE PLATELETS ARE RECENTLY PRODUCED
132
SELECT CLASSIFICATION MODEL FOCUSING ON CHARACTERISTICS EXHIBITED BY RECENTLY PRODUCED PLATELETS
134

CLASSIFICATION MODELS FOR ANALYZING A SAMPLE

CROSS-REFERENCE TO RELATED APPLICATIONS

The present application is a US national phase application of PCT Application No. PCT/IB2020/061732 to Zait (published as WO 21/116960), which claims priority from U.S. Provisional Patent Application No. 62/947,004 to Zait et al., filed Dec. 12, 2019, entitled "Classification Models for Analyzing a Sample," which is incorporated herein by reference.

FIELD OF EMBODIMENTS OF THE INVENTION

Some applications of the presently disclosed subject matter relate generally to analysis of bodily samples, and in particular, to optical density and microscopic measurements that are performed upon blood samples.

BACKGROUND

In some optics-based methods (e.g., diagnostic, and/or analytic methods), a property of a biological sample, such as a blood sample, is determined by performing an optical measurement. For example, the density of a component (e.g., a count of the component per unit volume) may be determined by counting the component within a microscopic image. Similarly, the concentration and/or density of a component may be measured by performing optical absorption, transmittance, fluorescence, and/or luminescence measurements upon the sample. Typically, the sample is placed into a sample carrier and the measurements are performed with respect to a portion of the sample that is contained within a chamber of the sample carrier. The measurements that are performed upon the portion of the sample that is contained within the chamber of the sample carrier are analyzed in order to determine a property of the sample.

SUMMARY OF EMBODIMENTS

In accordance with some applications of the present invention, a computer processor analyzes microscopic images of a bodily sample (such as a blood sample). Typically, the computer processor uses a machine-learning classifier (e.g., a convolutional neural network classifier, a decision tree classifier, a regression analysis classifier, a Bayesian network classifier, and/or a support network vector classifier), for classifying entities within the sample. For example, when used with a blood sample, such entities may include any one of platelets, white blood cells, anomalous white blood cells, circulating tumor cells, red blood cells, reticulocytes, Howell-Jolly bodies, etc. Typically, the computer processor uses classification models for classifying the entities. For example, such classification models may include determining whether characteristics of an identified element within the sample satisfy criteria, relating to size, intensity and/or other parameters within microscopic images that are acquired under respective imaging modalities (e.g., brightfield and/or fluorescent imaging modalities). For some applications, the computer processor initially identifies elements within images of the sample as being candidates of one or more given entities, based on features of the elements satisfying certain criteria. (Optionally, the initial identification of candidates is performed using a classification model.) Subsequently, the candidates are validated or rejected as being the given entity based upon applying a classification model to the candidates.

For some applications, the computer processor has a set of two or more classification models for classifying entities within the sample, and the computer processor selects which of the classification models to use, based upon a characteristic of the sample, as described in further detail hereinbelow. Alternatively or additionally, during the analysis of a sample, the computer processor adjusts a classification model in a dynamic manner, based upon characteristics of the sample that are determined by means of the analysis. For some applications, a combination of classification models is used. Typically, a smoothing function, such as linear interpolation or hyperbolic tangent, is used to smooth a transition between classification models.

For some applications, the computer processor selects from a plurality of classification models for classifying one or more entities in situations in which there is a given entity the number of which spans a large range across different samples. For example, in such cases, it may be desirable to provide different classifier performance at different concentrations of the given entity. At lower concentrations of the given entity, the ratio between occurrences of the entity itself and occurrences within the sample of elements that have similar characteristics to the entity (i.e., background similar elements) is lower. Therefore, in such situations, a classification model having a relatively high specificity (i.e., lower false positive rate) is typically used in order to distinguish between occurrences of the entity itself and background similar elements (which may have been identified as candidates of the given entity). By contrast, at higher concentrations of the given entity, the ratio between occurrences of the entity itself and occurrences within the sample of elements that have similar characteristics to the entity (i.e., background similar elements) is higher. Therefore, in such situations, a classification model having a relatively high sensitivity is typically used.

There is therefore provided, in accordance with some applications of the present invention, a method including:

analyzing one or more microscopic images of the blood sample using a machine-learning classifier, the analyzing including:

- identifying an entity within the one or more microscopic images using a first classification model;
- determining a first estimated concentration of the entity within the sample, based upon the entity as identified using the first classification model;
- identifying the entity within the one or more microscopic images using a second classification model;
- determining a second estimated concentration of the entity within the sample, based upon the entity as identified using the second classification model;
- comparing the first and second estimated concentrations to each other; and
- in response to the comparison, using a hybrid classification model that is a hybrid of the first and second classification models.

In some applications, identifying the entity within the blood sample includes identifying platelets within the blood sample.

In some applications, using the hybrid classification model that is a hybrid of the first and second classification models includes:

based on the comparison, determining that at least one of the estimated concentrations is close to a threshold platelet-concentration value that is of clinical relevance; and using the hybrid classification model in response thereto.

In some applications, determining that at least one of the estimated concentrations is close to the threshold platelet-concentration value that is of clinical relevance includes determining that the first estimated concentration is less than the threshold platelet-concentration value and the second estimated concentration is greater than the threshold platelet-concentration value.

There is further provided, in accordance with some applications of the present invention, apparatus including:

a microscope configured to acquire one or more microscopic images of the blood sample;

an output device; and at least one computer processor configured to:

analyze the one or more microscopic images of the blood sample using a machine-learning classifier, the analyzing including:

identifying an entity within the one or more microscopic images using a first classification model, determining a first estimated concentration of the entity within the sample, based upon the entity as identified using the first classification model, identifying the entity within the one or more microscopic images using a second classification model, determining a second estimated concentration of the entity within the sample, based upon the entity as identified using the second classification model, comparing the first and second estimated concentrations to each other, and in response to the comparison, using a hybrid classification model that is a hybrid of the first and second classification models, and generate an output on the output device based upon analyzing the one or more microscopic images of the blood sample using the machine-learning classifier.

In some applications, the computer processor is configured to identify the entity within the blood sample by identifying platelets within the blood sample.

In some applications, the computer processor is configured:

based on the comparison, to determine that at least one of the estimated concentrations is close to a threshold platelet-concentration value that is of clinical relevance; and to use the hybrid classification model in response thereto.

In some applications, the computer processor is configured to determine that at least one of the estimated concentrations is close to the threshold platelet-concentration value that is of clinical relevance by determining that the first estimated concentration is less than the threshold platelet-concentration value and the second estimated concentration is greater than the threshold platelet-concentration value.

There is further provided, in accordance with some applications of the present invention, a method including:

identifying a given entity within a blood sample, by analyzing one or more microscopic images of the blood sample using a machine-learning classifier, the analyzing including:

estimating a concentration of one or more entities within the sample;

in response thereto, selecting a classification model to use for identifying the entity; and identifying the given entity within the sample using the selected classification model.

In some applications, in response to a concentration of the entity exceeding a threshold, a classification model having a relatively high sensitivity is used for identifying the entity, and in response to the concentration of the entity being below the threshold, a classification model having a relatively high specificity is used for identifying the entity.

In some applications, estimating the concentration of one or more entities within the sample includes estimating the concentration of the given entity.

In some applications, estimating the concentration of one or more entities within the sample includes estimating the concentration of one or more entities within the sample other than the given entity.

In some applications, the method further includes enumerating the given entity.

In some applications, identifying the given entity including identifying candidates of the given entity, and validating a portion of the candidates of the given entity as being the given entity using the selected classification model.

In some applications, the method further includes identifying candidates of the given entity that are not validated as being the given entity using the selected classification model.

In some applications, the method further includes enumerating candidates of the given entity that are not validated as being the given entity.

In some applications, identifying the given entity within the blood sample includes identifying platelets within the blood sample.

In some applications, in response to a concentration of platelets exceeding a threshold, a classification model having a relatively high sensitivity is used for identifying platelets, and in response to the concentration of platelets being below the threshold, a classification model having a relatively high specificity is used for identifying platelets.

In some applications, identifying the given entity within the blood sample includes identifying a given type of pathogen within the blood sample.

In some applications, in response to a concentration of the pathogen type exceeding a threshold, a classification model having a relatively high sensitivity is used for identifying the pathogen type, and in response to the concentration of the pathogen type being below the threshold, a classification model having a relatively high specificity is used for identifying the pathogen type.

In some applications, identifying the given entity within the blood sample includes identifying a rare blood cell type within the blood sample, selected from the group consisting of: basophils, blasts, nucleated red blood cells, and activated platelets.

In some applications, in response to a concentration of the rare blood cell type exceeding a threshold, a classification model having a relatively high sensitivity is used for identifying the rare blood cell type, and in response to the concentration of the rare blood cell type being below the threshold, a classification model having a relatively high specificity is used for identifying the rare blood cell type.

There is further provided, in accordance with some applications of the present invention, apparatus including:

a microscope configured to acquire one or more microscopic images of the blood sample;

an output device; and at least one computer processor configured to:

identify a given entity within a blood sample, by analyzing one or more microscopic images of the blood sample using a machine-learning classifier, the analyzing including:

estimating a concentration of one or more entities within the sample, in response thereto, selecting a classification model to use for identifying the entity, and identifying the given entity within the sample using the selected classification model, and generate an output on the output device at least partially based upon the identified entity.

In some applications, the computer processor is configured, in response to a concentration of the entity exceeding a threshold, to use a classification model having a relatively high sensitivity is used for identifying the entity, and in response to the concentration of the entity being below the threshold, to use a classification model having a relatively high specificity for identifying the entity.

In some applications, the computer processor is configured to estimate the concentration of one or more entities within the sample by estimating the concentration of the given entity.

In some applications, the computer processor is configured to estimate the concentration of one or more entities within the sample by estimating the concentration of one or more entities within the sample other than the given entity.

In some applications, the computer processor is configured to enumerate the given entity.

In some applications, the computer processor is configured to identify the given entity by identifying candidates of the given entity, and validating a portion of the candidates of the given entity as being the given entity using the selected classification model.

In some applications, the computer processor is configured to identify candidates of the given entity that are not validated as being the given entity using the selected classification model.

In some applications, the computer processor is configured to enumerate candidates of the given entity that are not validated as being the given entity.

In some applications, the computer processor is configured to identify the given entity within the blood sample by identifying platelets within the blood sample.

In some applications, the computer processor is configured, in response to a concentration of platelets exceeding a threshold, to use a classification model having a relatively high sensitivity for identifying platelets, and in response to the concentration of platelets being below the threshold, to use a classification model having a relatively high specificity for identifying platelets.

In some applications, the computer processor is configured to identify the given entity within the blood sample by identifying a given type of pathogen within the blood sample.

In some applications, the computer processor is configured, in response to a concentration of the pathogen type exceeding a threshold, to use a classification model having a relatively high sensitivity for identifying the pathogen type, and in response to the concentration of the pathogen type being below the threshold, to use a classification model having a relatively high specificity for identifying the pathogen type.

In some applications, the computer processor is configured to identify the given entity within the blood sample by identifying a rare blood cell type within the blood sample, selected from the group consisting of: basophils, blasts, nucleated red blood cells, and activated platelets.

In some applications, the computer processor is configured, in response to a concentration of the rare blood cell type exceeding a threshold, to use a classification model having a relatively high sensitivity for identifying the rare blood cell type, and in response to the concentration of the rare blood cell type being below the threshold, to use a classification model having a relatively high specificity for identifying the rare blood cell type.

There is further provided, in accordance with some applications of the present invention, a method including:

identifying a first type of entity within a blood sample, by analyzing one or more microscopic images of the blood sample using a machine-learning classifier, the analyzing including:

estimating a concentration of a second type of entity within the sample;

in response thereto, selecting a classification model to use for identifying the first type of entity; and identifying the first type of entity within the sample using the selected classification model.

There is further provided, in accordance with some applications of the present invention, apparatus including:

a microscope configured to acquire one or more microscopic images of the blood sample;

an output device; and at least one computer processor configured to:

identify a first type of entity within a blood sample, by analyzing the one or more microscopic images of the blood sample using a machine-learning classifier, the analyzing including:

estimating a concentration of a second type of entity within the sample, in response thereto, selecting a classification model to use for identifying the first type of entity, and identifying the first type of entity within the sample using the selected classification model, and generate an output on the output device at least partially based upon the identified first type of entity.

There is further provided, in accordance with some applications of the present invention, a method including:

identifying an entity within a blood sample, by analyzing one or more microscopic images of the blood sample using a machine-learning classifier, the analyzing comprising:

iteratively:

(a) identifying the entity using a classification model;

(b) estimating a concentration of the entity within the sample, based upon the entity as identified using the classification model;

(c) in response to the estimated concentration of the entity, adjusting the classification model; and (d) identifying the entity using the adjusted classification model.

There is further provided, in accordance with some applications of the present invention, a method including:

identifying a given entity within a blood sample, by analyzing one or more microscopic images of the blood sample using a machine-learning classifier, the analyzing comprising:

iteratively:

(a) identifying one or more entities other than the given entity using a classification model for classifying entities within the sample;

(b) estimating a concentration within the sample of the one or more entities other than the given entity, based upon the one or more entities other than the given entity, as identified using the classification model;

(c) in response to the estimated concentration of the one or more entities other than the given entity, adjusting the classification model; and (d) identifying the given entity using the adjusted classification model.

There is further provided, in accordance with some applications of the present invention, a method including:

analyzing one or more microscopic images of the blood sample using a machine-learning classifier, the analyzing comprising:

identifying an entity within the one or more microscopic images using a first classification model;

determining a first estimated concentration of the entity within the sample, based upon the entity as identified using the first classification model;

identifying the entity within the one or more microscopic images using a second classification model;

determining a second estimated concentration of the entity within the sample, based upon the entity as identified using the second classification model;

comparing the first and second estimated concentrations to each other; and in response to the comparison, invalidating at least one of the first and second estimated concentrations.

The present invention will be more fully understood from the following detailed description of embodiments thereof, taken together with the drawings, in which:

DETAILED DESCRIPTION OF EMBODIMENTS

Figure 1:
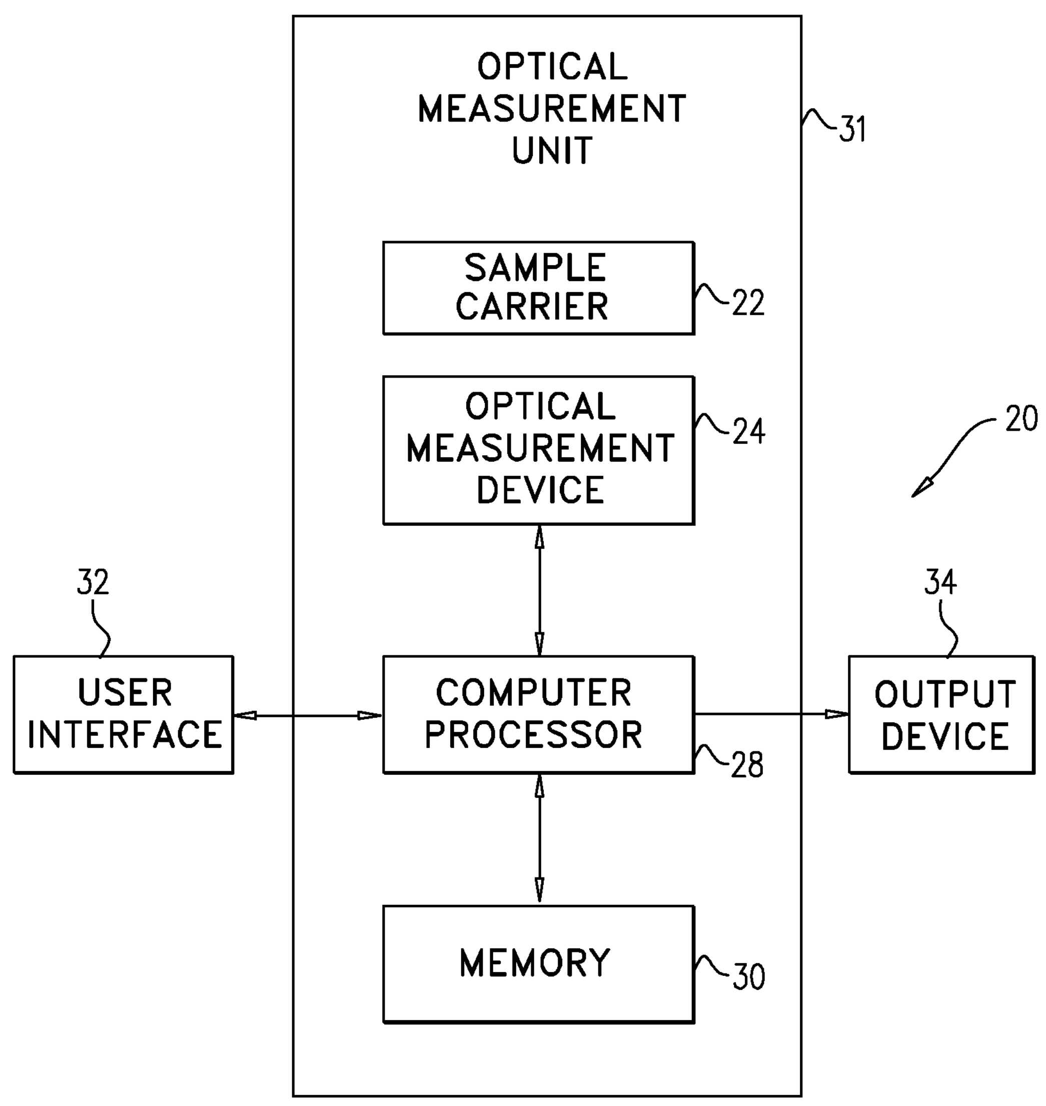
FIG. 1 is a block diagram showing components of a biological sample analysis system, in accordance some applications of the present invention.

Reference is now made to FIG. 1, which is block diagram showing components of a biological sample analysis system 20, in accordance with some applications of the present invention. Typically, a biological sample (e.g., a blood sample) is placed into a sample carrier 22. While the sample is disposed in the sample carrier, optical measurements are performed upon the sample using one or more optical measurement devices 24. For example, the optical measurement devices may include a microscope (e.g., a digital microscope), a spectrophotometer, a photometer, a spectrometer, a camera, a spectral camera, a hyperspectral camera, a fluorometer, a spectrofluorometer, and/or a photodetector (such as a photodiode, a photoresistor, and/or a phototransistor). For some applications, the optical measurement devices include dedicated light sources (such as light emitting diodes, incandescent light sources, etc.) and/or optical elements for manipulating light collection and/or light emission (such as lenses, diffusers, filters, etc.).

A computer processor 28 typically receives and processes optical measurements that are performed by the optical measurement device. Further typically, the computer processor controls the acquisition of optical measurements that are performed by the one or more optical measurement devices. The computer processor communicates with a memory 30. A user (e.g., a laboratory technician, or an individual from whom the sample was drawn) sends instructions to the computer processor via a user interface 32. For some applications, the user interface includes a keyboard, a mouse, a joystick, a touchscreen device (such as a smartphone or a tablet computer), a touchpad, a trackball, a voice-command interface, and/or other types of user interfaces that are known in the art. Typically, the computer processor generates an output via an output device 34. Further typically, the output device includes a display, such as a monitor, and the output includes an output that is displayed on the display. For some applications, the processor generates an output on a different type of visual, text, graphics, tactile, audio, and/or video output device, e.g., speakers, headphones, a smartphone, or a tablet computer. For some applications, user interface 32 acts as both an input interface and an output interface, i.e., it acts as an input/output interface. For some applications, the processor generates an output on a computer-readable medium (e.g., a non-transitory computer-readable medium), such as a disk, or a portable USB drive, and/or generates an output on a printer.

Figure 2A:
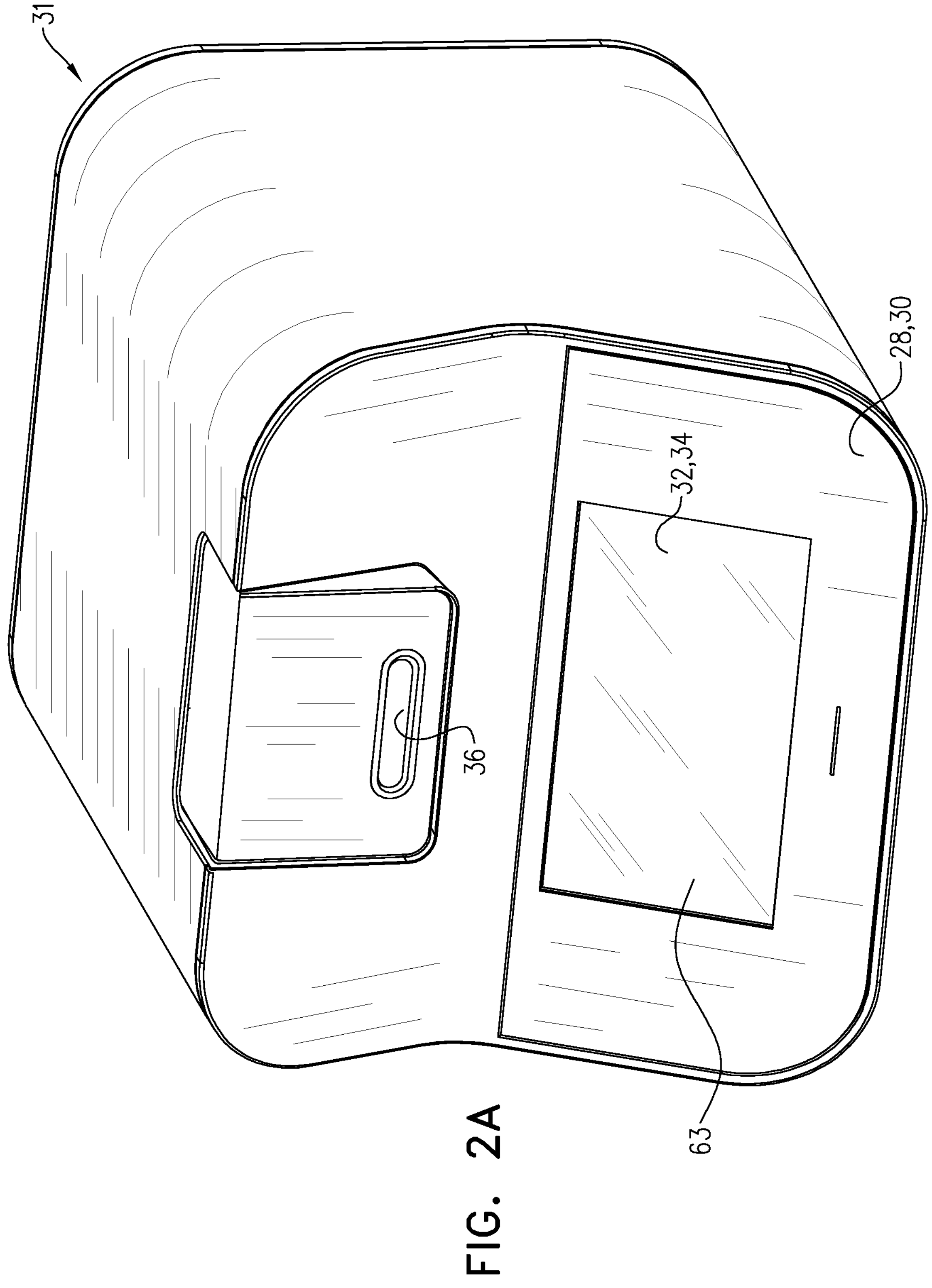
FIGS. 2A, 2B, and 2C are schematic illustrations of an optical measurement unit, in accordance with some applications of the present invention.
Figure 2B:
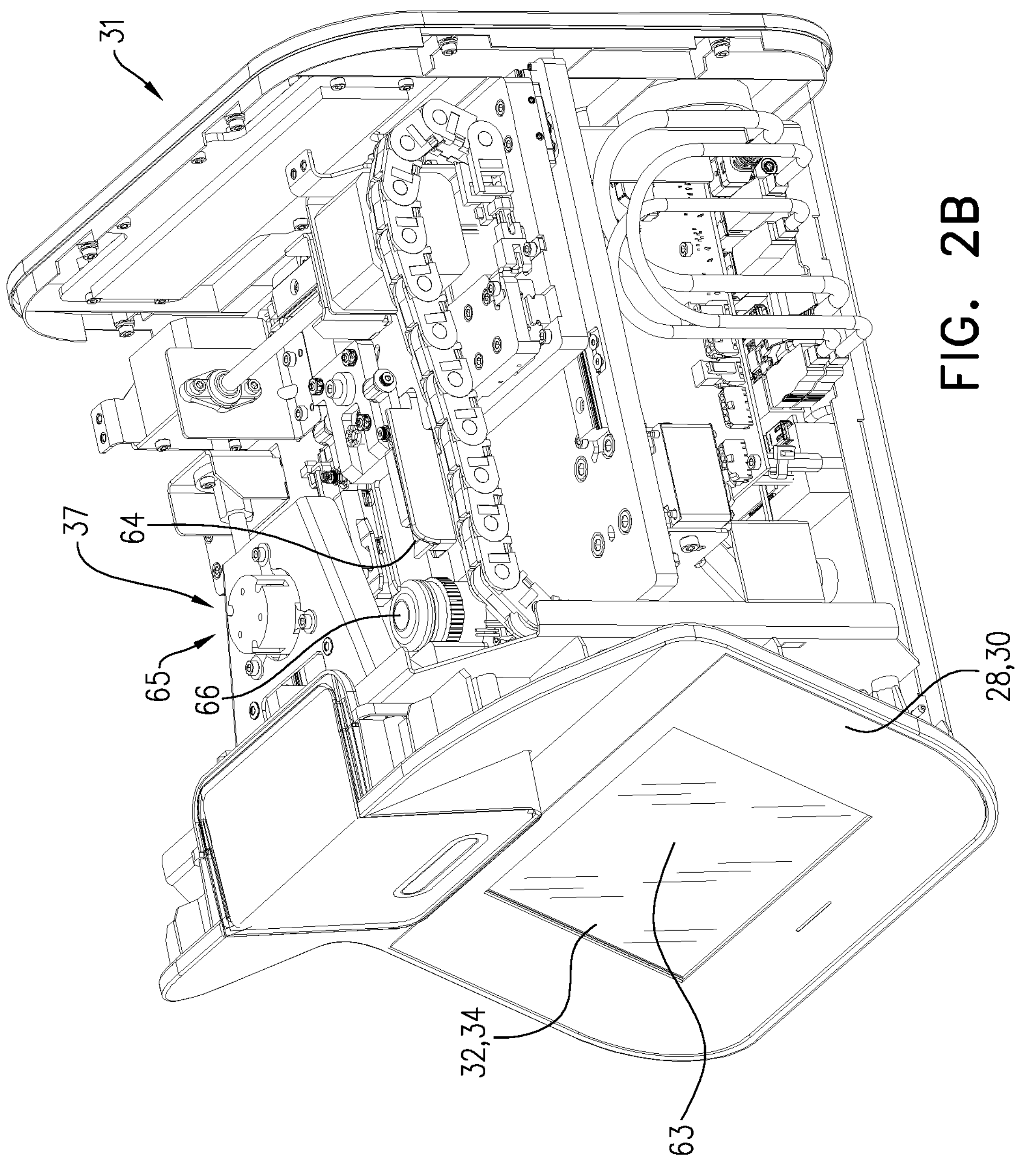
Figure 2C:
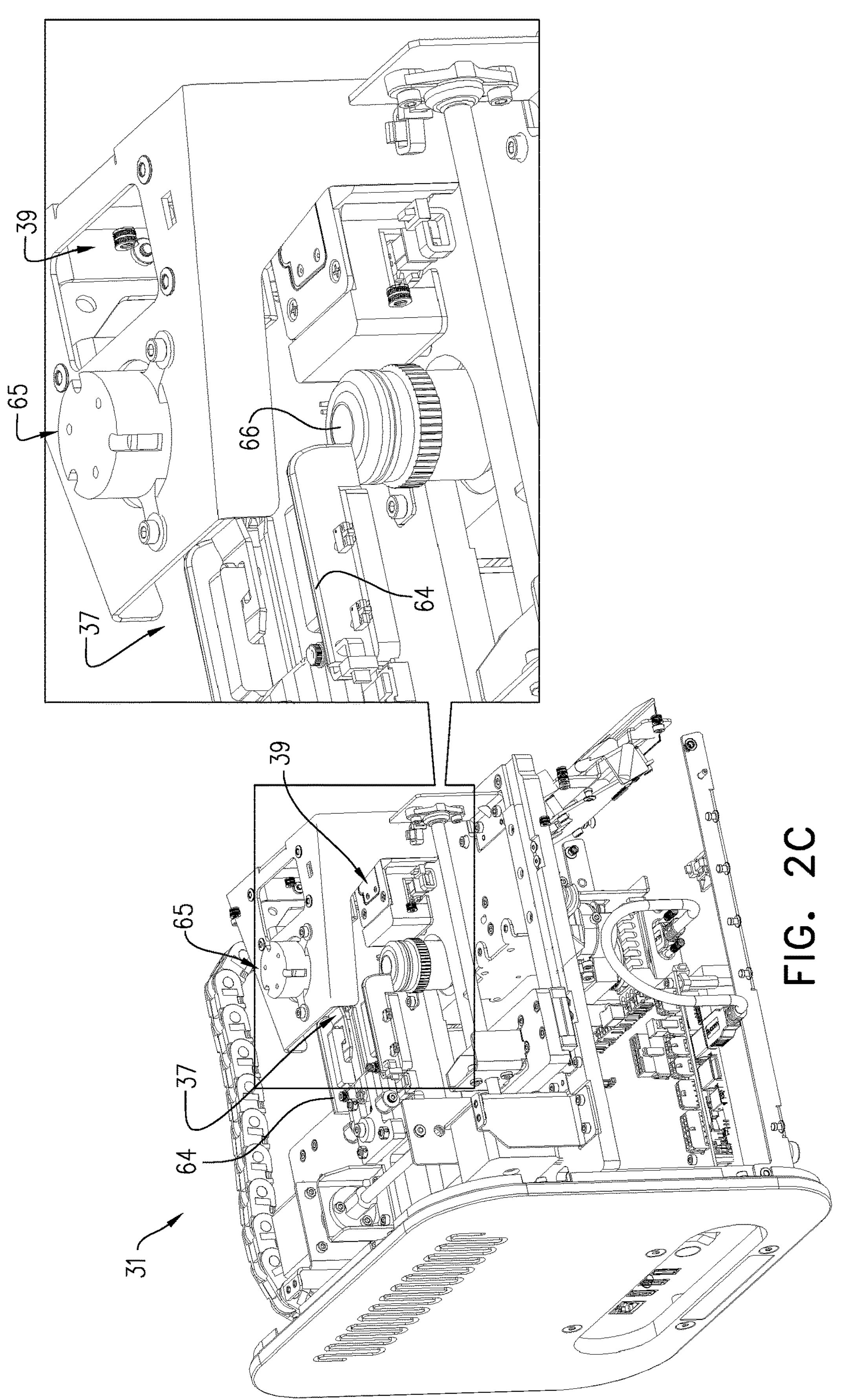

Reference is now made to FIGS. 2A, 2B, and 2C, which are schematic illustrations of an optical measurement unit 31, in accordance with some applications of the present invention. FIG. 2A shows an oblique view of the exterior of the fully assembled device, while FIGS. 2B and 2C shows respective oblique views of the device with the cover having been made transparent, such components within the device are visible. For some applications, one or more optical measurement devices 24 (and/or computer processor 28 and memory 30) is housed inside optical measurement unit 31. In order to perform the optical measurements upon the sample, sample carrier 22 is placed inside the optical measurement unit. For example, the optical measurement unit may define a slot 36, via which the sample carrier is inserted into the optical measurement unit. Typically, the optical measurement unit includes a stage 64, which is configured to support sample carrier 22 within the optical measurement unit. For some applications, a screen 63 on the cover of the optical measurement unit (e.g., a screen on the front cover of the optical measurement unit, as shown) functions as user interface 32 and/or output device 34.

Typically, the optical measurement unit includes microscope system 37 (shown in FIGS. 2B-C) configured to perform microscopic imaging of a portion of the sample. For some applications, the microscope system includes a set of light sources 65 (which typically include a set of brightfield light sources (e.g. light emitting diodes) that are configured to be used for brightfield imaging of the sample, a set of fluorescent light sources (e.g. light emitting diodes) that are configured to be used for fluorescent imaging of the sample), and a camera (e.g., a CCD camera, or a CMOS camera) configured to image the sample. Typically, the optical measurement unit also includes an optical-density-measurement unit 39 (shown in FIG. 2C) configured to perform optical density measurements (e.g., optical absorption measurements) on a second portion of the sample. For some applications, the optical-density-measurement unit includes a set of optical-density-measurement light sources (e.g., light emitting diodes) and light detectors, which are configured for performing optical density measurements on the sample. For some applications, each of the aforementioned sets of light sources (i.e., the set of brightfield light sources, the set of fluorescent light sources, and the set optical-density-measurement light sources) includes a plurality of light sources (e.g. a plurality of light emitting diodes), each of which is configured to emit light at a respective wavelength or at a respective band of wavelengths.

Figure 3A:
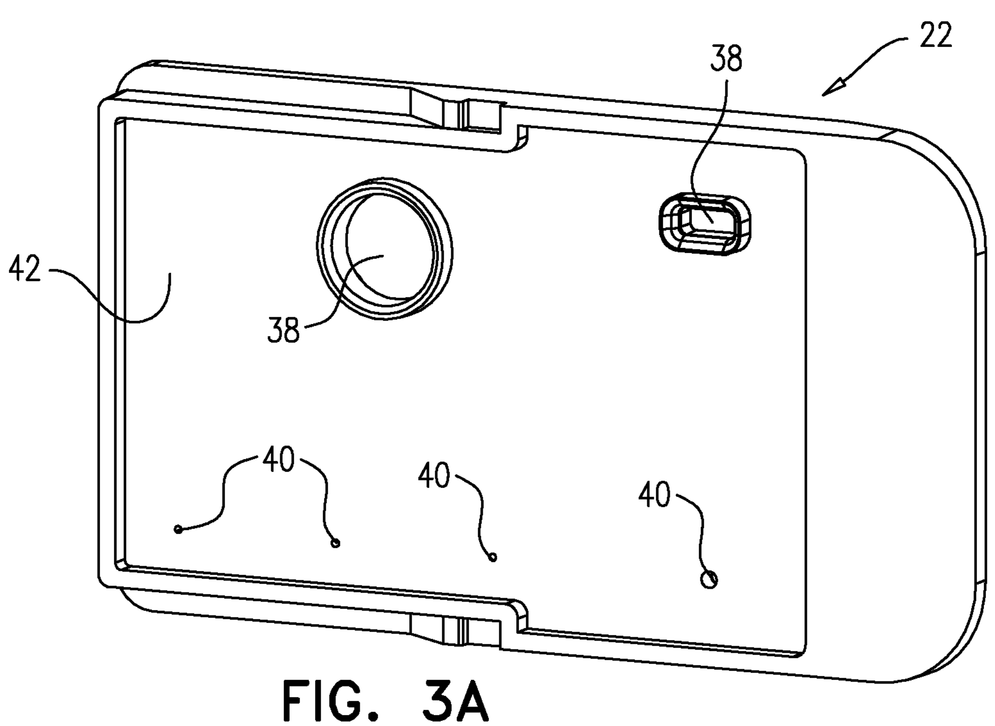
FIGS. 3A, 3B, and 3C are schematic illustrations of respective views of a sample carrier that is used for performing both microscopic measurements and optical density measurements, in accordance with some applications of the present invention.
Figure 3B:
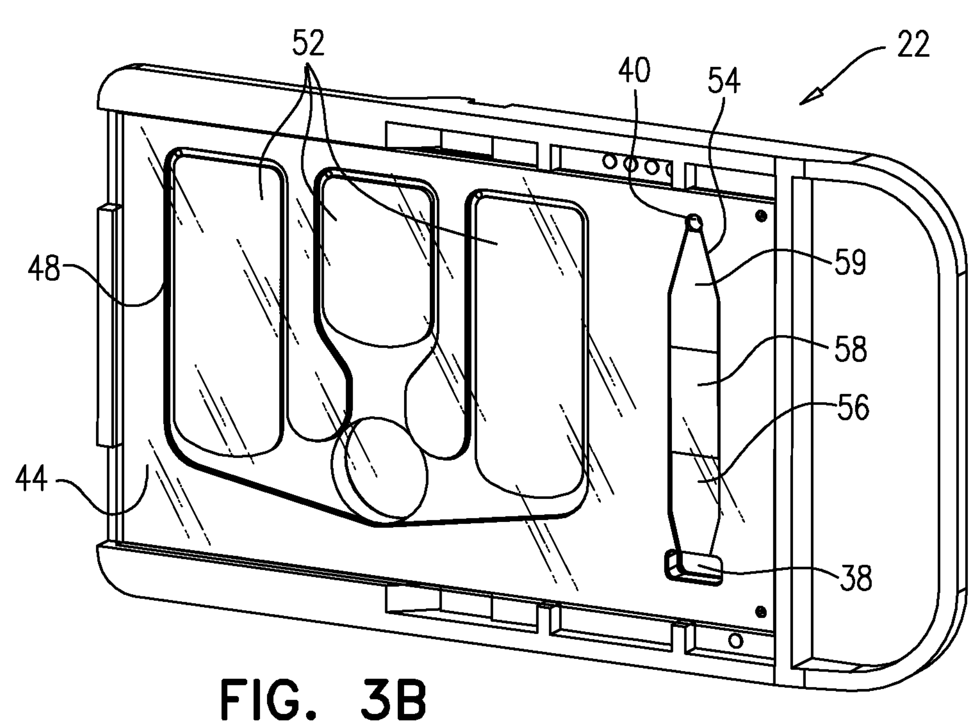

Reference is now made to FIGS. 3A and 3B, which are schematic illustrations of respective views of sample carrier 22, in accordance with some applications of the present invention. FIG. 3A shows a top view of the sample carrier (the top cover of the sample carrier being shown as being opaque in FIG. 3A, for illustrative purposes), and FIG. 3B shows a bottom view (in which the sample carrier has been rotated around its short edge with respect to the view shown in FIG. 3A). Typically, the sample carrier includes a first set 52 of one or more sample chambers, which are used for performing microscopic analysis upon the sample, and a second set 54 of sample chambers, which are used for performing optical density measurements upon the sample. Typically, the sample chambers of the sample carrier are filled with a bodily sample, such as blood via sample inlet holes 38. For some applications, the sample chambers define one or more outlet holes 40. The outlet holes are configured to facilitate filling of the sample chambers with the bodily sample, by allowing air that is present in the sample chambers to be released from the sample chambers. Typically, as shown, the outlet holes are located longitudinally opposite the inlet holes (with respect to a sample chamber of the sample carrier). For some applications, the outlet holes thus provide a more efficient mechanism of air escape than if the outlet holes were to be disposed closer to the inlet holes.

Figure 3C:
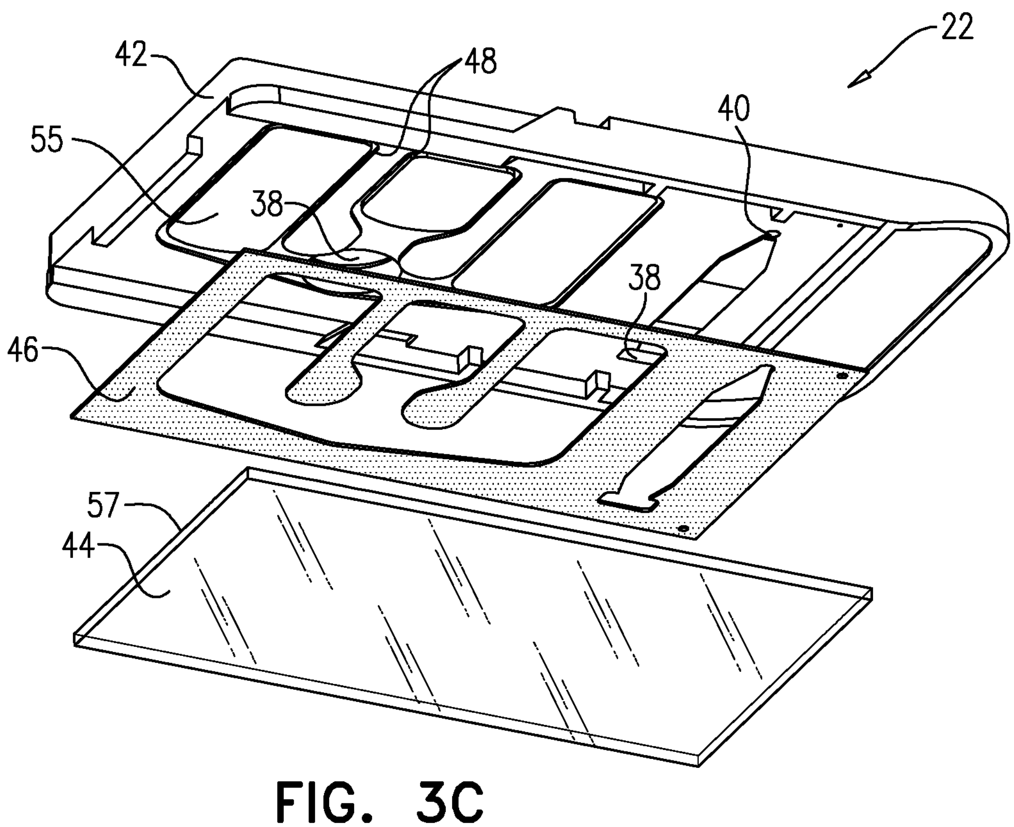

Reference is made to FIG. 3C, which shows an exploded view of sample carrier 22, in accordance with some applications of the present invention. For some applications, the sample carrier includes at least three components: a molded component 42, a glass layer 44 (e.g., glass sheet), and an adhesive layer 46 configured to adhere the glass layer to an underside of the molded component. The molded component is typically made of a polymer (e.g., a plastic) that is molded (e.g., via injection molding) to provide the sample chambers with a desired geometrical shape. For example, as shown, the molded component is typically molded to define inlet holes 38, outlet holes 40, and gutters 48 which surround the central portion of each of the sample chambers. The gutters typically facilitate filling of the sample chambers with the bodily sample, by allowing air to flow to the outlet holes, and/or by allowing the bodily sample to flow around the central portion of the sample chamber.

For some applications, a sample carrier as shown in FIGS. 3A-C is used when performing a complete blood count on a blood sample. For some such applications, the sample carrier is used with optical measurement unit 31 configured as generally shown and described with reference to FIGS. 2A-C. For some applications, a first portion of the blood sample is placed inside first set 52 of sample chambers (which are used for performing microscopic analysis upon the sample, e.g., using microscope system 37 (shown in FIGS. 2B-C)), and a second portion of the blood sample is placed inside second set 54 of sample chambers (which are used for performing optical density measurements upon the sample, e.g., using optical-density-measurement unit 39 (shown in FIG. 2C)). For some applications, first set 52 of sample chambers includes a plurality of sample chambers, while second set 54 of sample chambers includes only a single sample chamber, as shown. However, the scope of the present application, includes using any number of sample chambers (e.g., a single sample chamber or a plurality of sample chambers) within either the first set of sample chambers or within the second set of sample chambers, or any combination thereof. The first portion of the blood sample is typically diluted with respect to the second portion of the blood sample. For example, the diluent may contain pH buffers, stains, fluorescent stains, antibodies, sphering agents, lysing agents, etc. Typically, the second portion of the blood sample, which is placed inside second set 54 of sample chambers is a natural, undiluted blood sample. Alternatively or additionally, the second portion of the blood sample may be a sample that underwent some modification, including, for example, one or more of dilution (e.g., dilution in a controlled fashion), addition of a component or reagent, or fractionation.

For some applications, one or more staining substances are used to stain the first portion of the blood sample (which is placed inside first set 52 of sample chambers) before the sample is imaged microscopically. For example, the staining substance may be configured to stain DNA with preference over staining of other cellular components. Alternatively, the staining substance may be configured to stain all cellular nucleic acids with preference over staining of other cellular components. For example, the sample may be stained with Acridine Orange reagent, Hoechst reagent, and/or any other staining substance that is configured to preferentially stain DNA and/or RNA within the blood sample. Optionally, the staining substance is configured to stain all cellular nucleic acids but the staining of DNA and RNA are each more prominently visible under some lighting and filter conditions, as is known, for example, for Acridine Orange. Images of the sample may be acquired using imaging conditions that allow detection of cells (e.g., brightfield) and/or imaging conditions that allow visualization of stained bodies (e.g. appropriate fluorescent illumination). Typically, the first portion of the sample is stained with Acridine Orange and with a Hoechst reagent. For example, the first (diluted) portion of the blood sample may be prepared using techniques as described in U.S. Pat. No. 9,329,129 to Pollak, which is incorporated herein by reference, and which describes a method for preparation of blood samples for analysis that involves a dilution step, the dilution step facilitating the identification and/or counting of components within microscopic images of the sample. For some applications, the first portion of the sample is stained with one or more stains that cause platelets within the sample to be visible under brightfield imaging conditions and/or under fluorescent imaging conditions, e.g., as described hereinabove. For example, the first portion of the sample may be stained with methylene blue and/or Romanowsky stains.

Referring again to FIG. 2B, typically, sample carrier 22 is supported within the optical measurement unit by stage 64. Further typically, the stage has a forked design, such that the sample carrier is supported by the stage around the edges of the sample carrier, but such that the stage does not interfere with the visibility of the sample chambers of the sample carrier by the optical measurement devices. For some applications, the sample carrier is held within the stage, such that molded component 42 of the sample carrier is disposed above the glass layer 44, and such that an objective lens 66 of a microscope unit of the optical measurement unit is disposed below the glass layer of the sample carrier. Typically, at least some light sources 65 that are used during microscopic measurements that are performed upon the sample (for example, light sources that are used during brightfield imaging) illuminate the sample carrier from above the molded component. Further typically, at least some additional light sources (not shown) illuminate the sample carrier from below the sample carrier (e.g., via the objective lens). For example, light sources that are used to excite the sample during fluorescent microscopy may illuminate the sample carrier from below the sample carrier (e.g., via the objective lens).

Typically, prior to being imaged microscopically, the first portion of blood (which is placed in first set 52 of sample chambers) is allowed to settle such as to form a monolayer of cells, e.g., using techniques as described in U.S. Pat. No. 9,329,129 to Pollak, which is incorporated herein by reference. For some applications, the first portion of blood is a cell suspension and the chambers belonging to the first set 52 of chambers each define a cavity 55 that includes a base surface 57 (shown in FIG. 3C). Typically, the cells in the cell suspension are allowed to settle on the base surface of the sample chamber of the carrier to form a monolayer of cells on the base surface of the sample chamber. Subsequent to the cells having been left to settle on the base surface of the sample chamber (e.g., by having been left to settle for a predefined time interval), at least one microscopic image of at least a portion of the monolayer of cells is typically acquired. Typically, a plurality of images of the monolayer are acquired, each of the images corresponding to an imaging field that is located at a respective, different area within the imaging plane of the monolayer. Typically, an optimum depth level at which to focus the microscope in order to image the monolayer is determined, e.g., using techniques as described in U.S. Pat. No. 10,176,565 to Greenfield, which is incorporated herein by reference. For some applications, respective imaging fields have different optimum depth levels from each other.

It is noted that, in the context of the present application, the term monolayer is used to mean a layer of cells that have settled, such as to be disposed within a single focus level of the microscope (referred to herein as "the monolayer focus level"). Within the monolayer there may be some overlap of cells, such that within certain areas there are two or more overlapping layers of cells. For example, red blood cells may overlap with each other within the monolayer, and/or platelets may overlap with, or be disposed above, red blood cells within the monolayer.

For some applications, the microscopic analysis of the first portion of the blood sample is performed with respect to the monolayer of cells. Typically, the first portion of the blood sample is imaged under brightfield imaging, i.e., under illumination from one or more light sources (e.g., one or more light emitting diodes, which typically emit light at respective spectral bands). Further typically, the first portion of the blood sample is additionally imaged under fluorescent imaging. Typically, the fluorescent imaging is performed by exciting stained objects (i.e., objects that have absorbed the stain(s)) within the sample by directing light toward the sample at known excitation wavelengths (i.e., wavelengths at which it is known that stained objects emit fluorescent light if excited with light at those wavelengths), and detecting the fluorescent light. Typically, for the fluorescent imaging, a separate set of light sources (e.g., one or more light emitting diodes) is used to illuminate the sample at the known excitation wavelengths.

As described with reference to US 2019/0302099 to Pollak, which is incorporated herein by reference, for some applications, sample chambers belonging to set 52 (which is used for microscopy measurements) have different heights from each other, in order to facilitate different measurands being measured using microscope images of respective sample chambers, and/or different sample chambers being used for microscopic analysis of respective sample types. For example, if a blood sample, and/or a monolayer formed by the sample, has a relatively low density of red blood cells, then measurements may be performed within a sample chamber of the sample carrier having a greater height (i.e., a sample chamber of the sample carrier having a greater height relative to a different sample chamber having a relatively lower height), such that there is a sufficient density of cells, and/or such that there is a sufficient density of cells within the monolayer formed by the sample, to provide statistically reliable data. Such measurements may include, for example red blood cell density measurements, measurements of other cellular attributes, (such as counts of abnormal red blood cells, red blood cells that include intracellular bodies (e.g., pathogens, Howell-Jolly bodies), etc.), and/or hemoglobin concentration. Conversely, if a blood sample, and/or a monolayer formed by the sample, has a relatively high density of red blood cells, then such measurements may be performed upon a sample chamber of the sample carrier having a relatively low height, for example, such that there is a sufficient sparsity of cells, and/or such that there is a sufficient sparsity of cells within the monolayer of cells formed by the sample, that the cells can be identified within microscopic images. For some applications, such methods are performed even without the variation in height between the sample chambers belonging to set 52 being precisely known.

For some applications, based upon the measurand that is being measured, the sample chamber within the sample carrier upon which to perform optical measurements is selected. For example, a sample chamber of the sample carrier having a greater height may be used to perform a white blood cell count (e.g., to reduce statistical errors which may result from a low count in a shallower region), white blood cell differentiation, and/or to detect more rare forms of white blood cells. Conversely, in order to determine mean corpuscular hemoglobin (MCH), mean corpuscular volume (MCV), red blood cell distribution width (RDW), red blood cell morphologic features, and/or red blood cell abnormalities, microscopic images may be obtained from a sample chamber of the sample carrier having a relatively low height, since in such sample chambers the cells are relatively sparsely distributed across the area of the region, and/or form a monolayer in which the cells are relatively sparsely distributed. Similarly, in order to count platelets, classify platelets, and/or extract any other attributes (such as volume) of platelets, microscopic images may be obtained from a sample chamber of the sample carrier having a relatively low height, since within such sample chambers there are fewer red blood cells which overlap (fully or partially) with the platelets in microscopic images, and/or in a monolayer.

In accordance with the above-described examples, it is preferable to use a sample chamber of the sample carrier having a lower height for performing optical measurements for measuring some measurands within a sample (such as a blood sample), whereas it is preferable to use a sample chamber of the sample carrier having a greater height for performing optical measurements for measuring other measurands within such a sample. Therefore, for some applications, a first measurand within a sample is measured, by performing a first optical measurement upon (e.g., by acquiring microscopic images of) a portion of the sample that is disposed within a first sample chamber belonging to set 52 of the sample carrier, and a second measurand of the same sample is measured, by performing a second optical measurement upon (e.g., by acquiring microscopic images of) a portion of the sample that is disposed within a second sample chamber of set 52 of the sample carrier. For some applications, the first and second measurands are normalized with respect to each other, for example, using techniques as described in US 2019/0145963 to Zait, which is incorporated herein by reference.

Typically, in order to perform optical density measurements upon the sample, it is desirable to know the optical path length, the volume, and/or the thickness of the portion of the sample upon which the optical measurements were performed, as precisely as possible. Typically, an optical density measurement is performed on the second portion of the sample (which is typically placed into second set 54 of sample chambers in an undiluted form). For example, the concentration and/or density of a component may be measured by performing optical absorption, transmittance, fluorescence, and/or luminescence measurements upon the sample.

Referring again to FIG. 3B, for some applications, sample chambers belonging to set 54 (which is used for optical density measurements), typically define at least a first region 56 (which is typically deeper) and a second region 58 (which is typically shallower), the height of the sample chambers varying between the first and second regions in a predefined manner, e.g., as described in US 2019/0302099 to Pollak, which is incorporated herein by reference. The heights of first region 56 and second region 58 of the sample chamber are defined by a lower surface that is defined by the glass layer and by an upper surface that is defined by the molded component. The upper surface at the second region is stepped with respect to the upper surface at the first region. The step between the upper surface at the first and second regions, provides a predefined height difference Δh between the regions, such that even if the absolute height of the regions is not known to a sufficient degree of accuracy (for example, due to tolerances in the manufacturing process), the height difference Δh is known to a sufficient degree of accuracy to determine a parameter of the sample, using the techniques described herein, and as described in US 2019/0302099 to Pollak, which is incorporated herein by reference. For some applications, the height of the sample chamber varies from the first region 56 to the second region 58, and the height then varies again from the second region to a third region 59, such that, along the sample chamber, first region 56 defines a maximum height region, second region 58 defines a medium height region, and third region 59 defines a minimum height region. For some applications, additional variations in height occur along the length of the sample chamber, and/or the height varies gradually along the length of the sample chamber.

As described hereinabove, while the sample is disposed in the sample carrier, optical measurements are performed upon the sample using one or more optical measurement devices 24. Typically, the sample is viewed by the optical measurement devices via the glass layer, glass being transparent at least to wavelengths that are typically used by the optical measurement device. Typically, the sample carrier is inserted into optical measurement unit 31, which houses the optical measurement device while the optical measurements are performed. Typically, the optical measurement unit houses the sample carrier such that the molded layer is disposed above the glass layer, and such that the optical measurement unit is disposed below the glass layer of the sample carrier and is able to perform optical measurements upon the sample via the glass layer. The sample carrier is formed by adhering the glass layer to the molded component. For example, the glass layer and the molded component may be bonded to each other during manufacture or assembly (e.g. using thermal bonding, solvent-assisted bonding, ultrasonic welding, laser welding, heat staking, adhesive, mechanical clamping and/or additional substrates). For some applications, the glass layer and the molded component are bonded to each other during manufacture or assembly using adhesive layer 46.

In accordance with some applications of the present invention, when analyzing a bodily sample (such as a blood sample), the computer processor uses a machine-learning classifier (e.g., a convolutional neural network classifier, a decision tree classifier, a regression analysis classifier, a Bayesian network classifier, and/or a support network vector classifier), for classifying entities within the sample. For example, when used with a blood sample, such entities may include any one of platelets, white blood cells, anomalous white blood cells, circulating tumor cells, red blood cells, reticulocytes, Howell-Jolly bodies, etc. Typically, the computer processor uses classification models for classifying the entities. For example, such classification models may include determining whether characteristics of an identified element within the sample satisfy criteria, relating to size, intensity and/or other parameters within images that are acquired under respective imaging modalities (e.g., as described hereinabove). For some applications, the computer processor initially identifies elements within images of the sample as being candidates of one or more given entities, based on features of the elements satisfying certain criteria. (Optionally, the initial identification of candidates is performed using a classification model.) Subsequently, the candidates are validated or rejected as being the given entity based upon applying a classification model to the candidates.

For some applications, the computer processor has a set of two or more classification models for classifying entities within the sample, and the computer processor selects which of the classification models to use, based upon a characteristic of the sample, as described in further detail hereinbelow. Alternatively or additionally, during the analysis of a sample, the computer processor adjusts a classification model in a dynamic manner, based upon characteristics of the sample that are determined by means of the analysis. For some applications, a combination of classification models is used. Typically, a smoothing function, such as linear interpolation or hyperbolic tangent, is used to smooth a transition between classification models.

For some applications, the computer processor selects from a plurality of classification models for classifying one or more entities in situations in which there is a given entity the number of which spans a large range across different samples. For example, in such cases, it may be desirable to provide different classifier performance at different concentrations of the given entity. At lower concentrations of the given entity, the ratio between occurrences of the entity itself and occurrences within the sample of elements that have similar characteristics to the entity (i.e., background similar elements) is lower. Therefore, in such situations, a classification model having a relatively high specificity (i.e., lower false positive rate) is typically used in order to distinguish between occurrences of the entity itself and background similar elements (which may have been identified as candidates of the given entity). By contrast, at higher concentrations of the given entity, the ratio between occurrences of the entity itself and occurrences within the sample of elements that have similar characteristics to the entity (i.e., background similar elements) is higher. Therefore, in such situations, a classification model having a relatively high sensitivity is typically used.

Figure 4A:
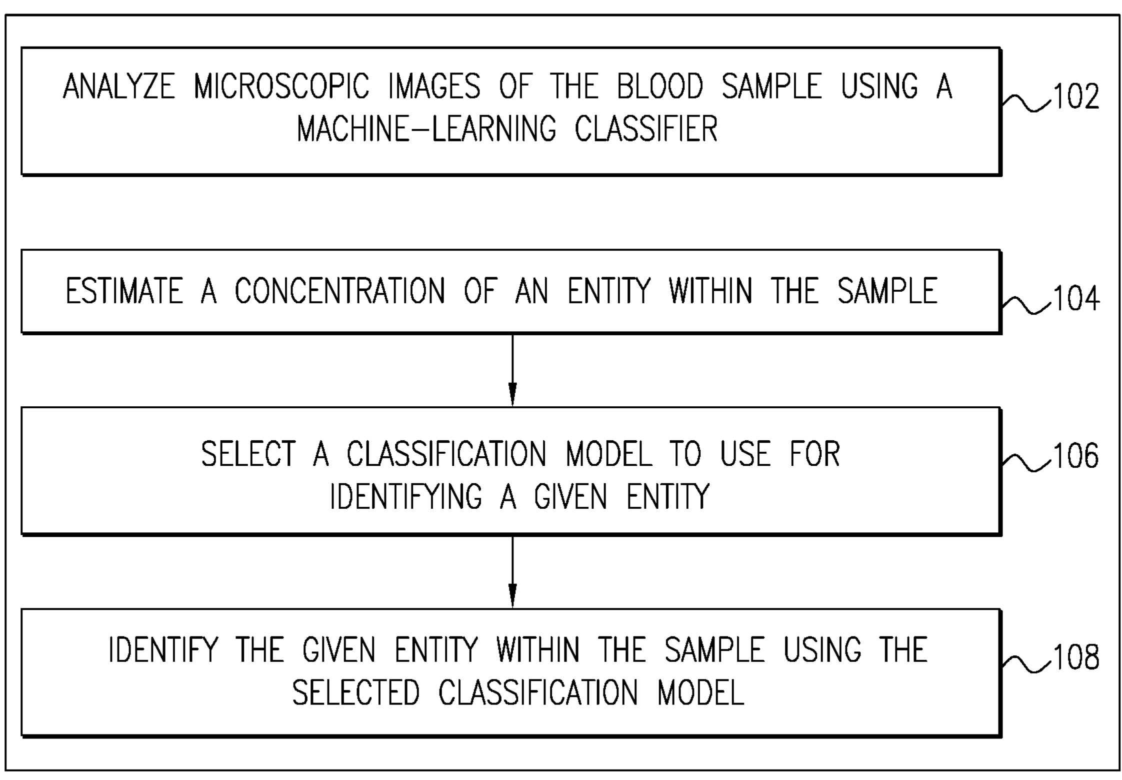
FIGS. 4A, 4B, 4C, and 4D are flowcharts showing steps of a method that are performed, in accordance with some applications of the present invention.

Reference is made to FIG. 4A, which is a generalized flowchart of steps that are performed, in accordance with some applications of the present invention. One or more microscopic images of a blood sample are analyzed using a machine-learning classifier, to identify a given entity within the blood sample (step 102). The analyzing includes estimating a concentration of one or more entities within the sample (step 104), and in response thereto, select a classification model to use for identifying the entity (step 106). The given entity is then identified and within the sample using the selected classification model (step 108).

Figure 4B:
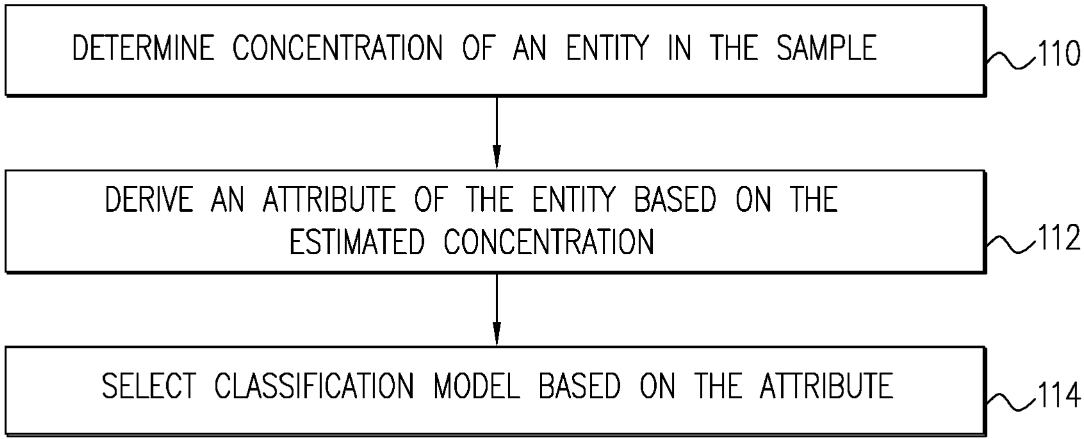
Figures 4C, 4D:
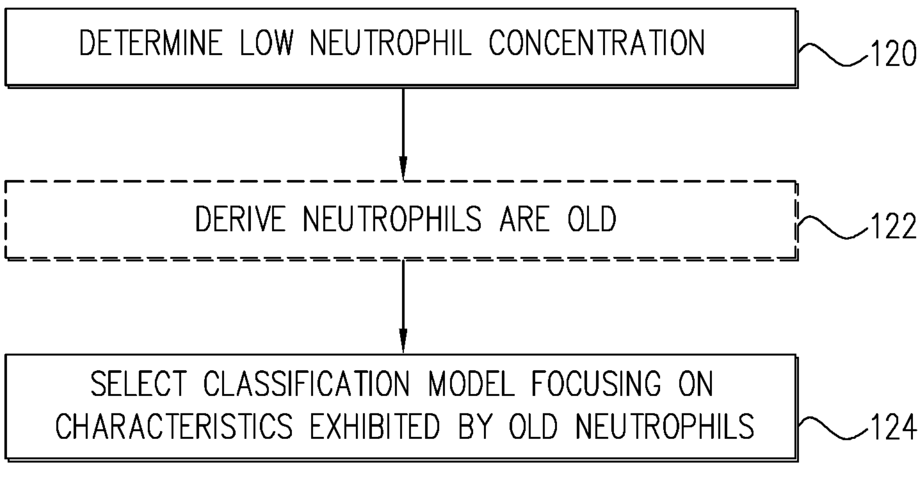

Reference is additionally made to FIGS. 4B-D which are additional flowcharts of steps that are performed, in accordance with some applications of the present invention.

As shown in FIG. 4B, for some applications, based upon the concentration of the given entity (step 110), a likely attribute of that entity (e.g., age, or type) within the sample is derived (step 112), and a classification model is then selected that accounts for that attribute (step 114). For example, low neutrophil numbers are typically associated with a suppressed bone marrow production. As such, as shown for example in FIG. 4C, if the computer processor determines that neutrophils numbers are low (step 120), this may indicate that neutrophils that are present within a blood sample are likely to be old neutrophils (step 122). Therefore, the computer processor may use a classification model that focuses on characteristics that are typically exhibited by old neutrophils (step 124). It is noted that step 122 of the flowchart shown in FIG. 4C may not be actively be performed by computer processor 28. Rather, this is typically an assumption, by virtue of which the computer processor may be configured to proceed directly from step 120 to step 124. This is indicated by step 122 in the flowchart being dashed.

Another example is that a high platelet concentration may be indicative of there being a large proportion of platelets within the sample that are relatively recently produced. Therefore, as shown for example in FIG. 4D, in response to detecting that there is a relatively high platelet concentration (step 130), (as this may indicate that platelets that are present within a blood sample are likely to have been recently-produced (step 132)), the computer processor may use a classification model that focuses on characteristics that are typically exhibited by recently-produced platelets (step 134). It is noted that step 132 of the flowchart shown in FIG. 4D may not be actively be performed by computer processor 28. Rather, this is typically an assumption, by virtue of which the computer processor may be configured to proceed directly from step 130 to step 134. This is indicated by step 132 in the flowchart being dashed.

For some applications, based on a concentration of a first entity, a classification model is selected for identifying a second entity. For example, based on the concentration of a given entity (e.g., platelets), a given classification model may be selected. The given classification model may then be used for identifying candidates of the given entity that are not validated as being the given entity (i.e., background similar elements, for example, platelet-like-background elements that are not validated as platelets). Typically, candidates of the given entity that are not validated as being the given entity are enumerated. For some applications, in response to detecting a relatively high concentration of reticulocytes, a classification model having a relatively high specificity may be selected for detecting parasites. This is because it is typically the case that there is a correlation between a high reticulocyte count and false positive parasite detections.

Figure 5:
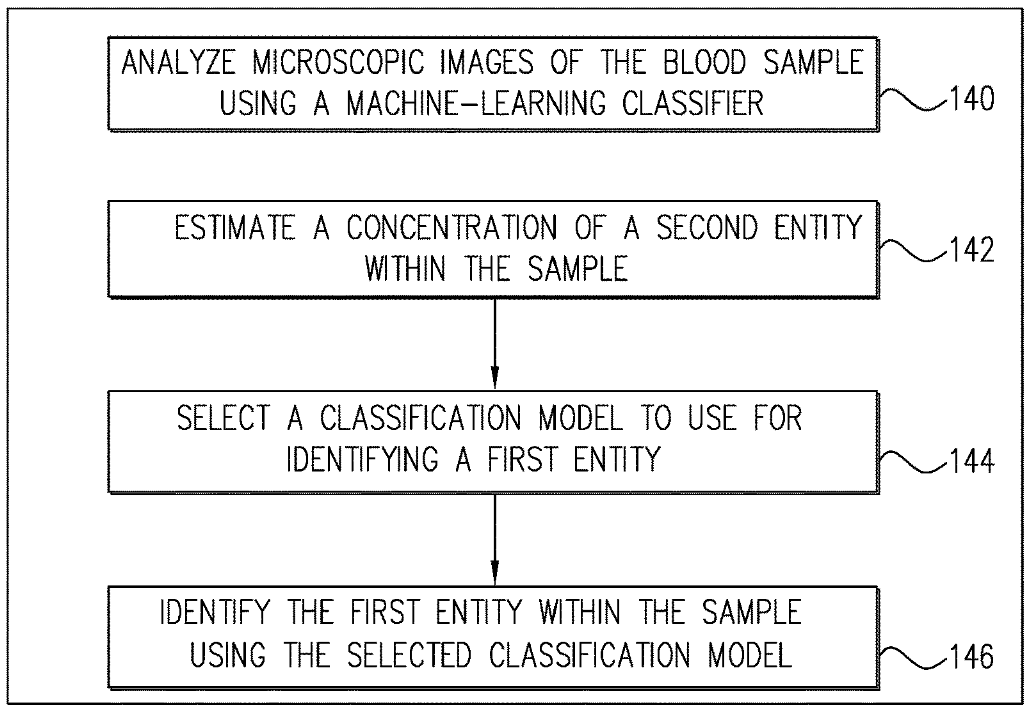
FIG. 5 is a flowchart showing steps of a method that are performed, in accordance with some applications of the present invention.

Reference is made to FIG. 5, which is a generalized flowchart of steps that are performed in which, a classification model is selected for identifying a first entity, based on a concentration of a second entity, in accordance with some applications of the present invention. Typically, one or more microscopic images of a blood sample are analyzed using a machine-learning classifier (step 140). The analyzing typically includes estimating a concentration of the second entity within the sample (step 142), and in response thereto, selecting a classification model to use for identifying the first entity (step 144). The first entity is then identified and within the sample using the selected classification model (step 146).

For some applications, a given classification model is used for validating candidates of a given entity as a given entity. For some such applications, in response to the number of unvalidated candidates exceeding a threshold, the classification model is changed.

Figure 6:
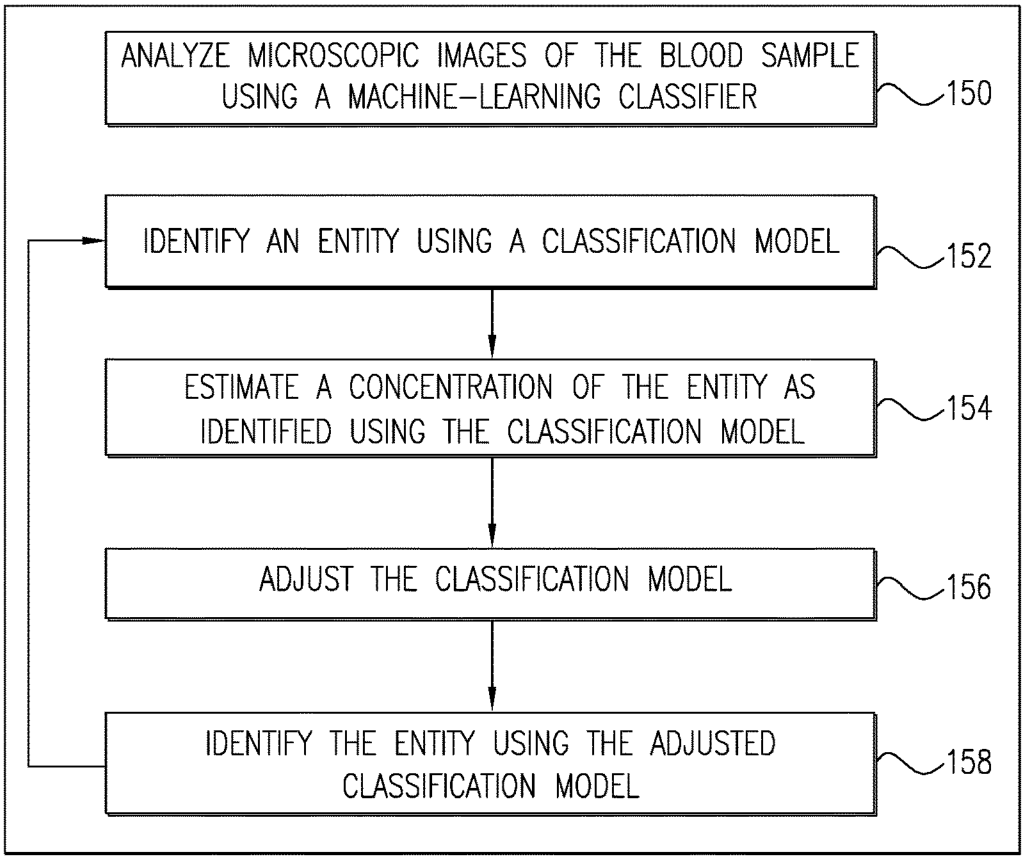
FIG. 6 is a flowchart showing steps of a method that are performed, in accordance with some applications of the present invention.

As described hereinabove, for some applications, during the analysis of a sample, the computer processor adjusts a classification model in a dynamic manner, based upon characteristics of the sample that are determined by means of the analysis. For example, and as shown in the flowchart in FIG. 6, in analyzing microscopic images of the blood sample using a machine-learning classifier (step 150), the following steps may be performed iteratively: (a) identifying an entity using a classification model (step 152), (b) estimating a concentration of the entity within the sample, based upon the entity as identified using the classification model (step 154), (c) in response to the estimated concentration of the entity, adjusting the classification model (step 156), and (d) identifying the entity using the adjusted classification model (step 158). For some applications, steps (a)-(d) (steps 152-158) are then repeated (e.g., repeated iteratively) using the adjusted classification model.

Figure 7:
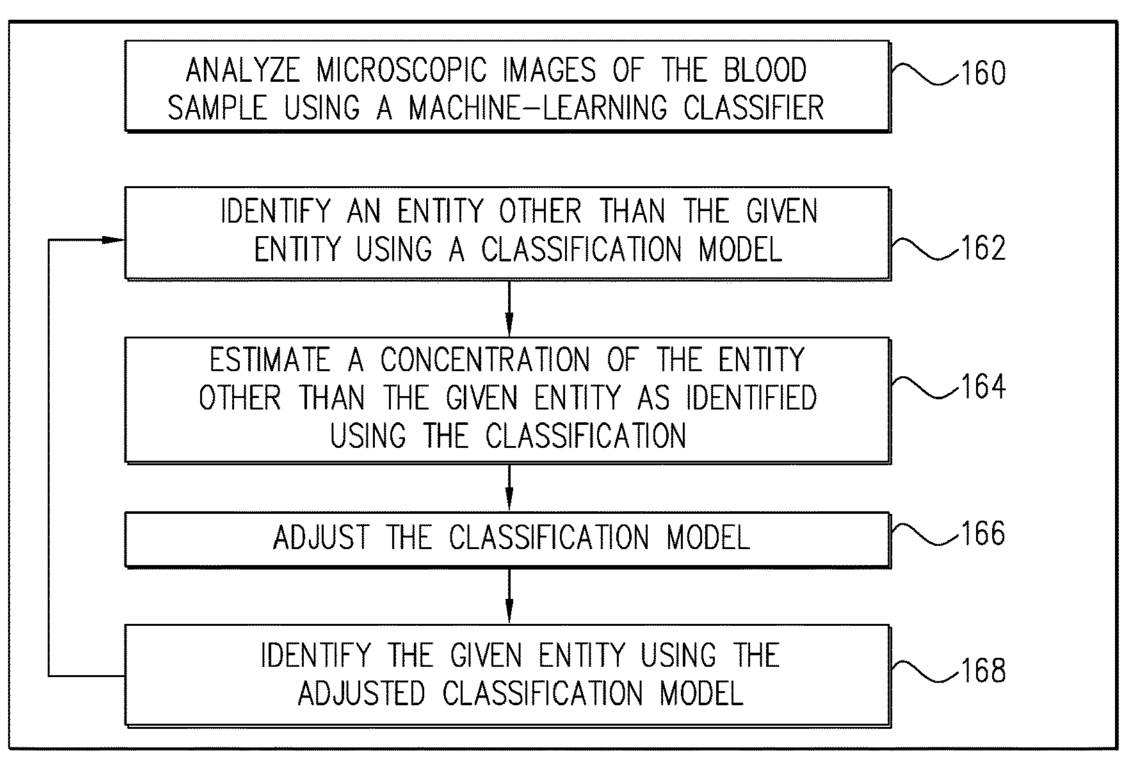
FIG. 7 is a flowchart showing steps of a method that are performed, in accordance with some applications of the present invention.

Alternatively or additionally, and as shown in the flowchart in FIG. 7, in analyzing microscopic images of the blood sample using a machine-learning classifier (step 160), the following steps may be performed iteratively: (a) identifying one or more entities other than the given entity using a classification model for classifying entities within the sample (step 162), (b) estimating a concentration within the sample of the one or more entities other than the given entity, based upon the one or more entities other than the given entity, as identified using the classification model (step 164), (c) in response to the estimated concentration of the one or more entities other than the given entity, adjusting the classification model (step 166), and (d) identifying the given entity using the adjusted classification model (step 168). For some applications, steps (a)-(d) (steps 162-168) are then repeated (e.g., repeated iteratively) using the adjusted classification model.

For some applications, the adjustment of the classification model as described in the above two paragraphs includes selecting a different classification model. Alternatively or additionally, a similar classification model may be used but the thresholds for one or more parameters that are used within the model may be adjusted.

Figure 8:
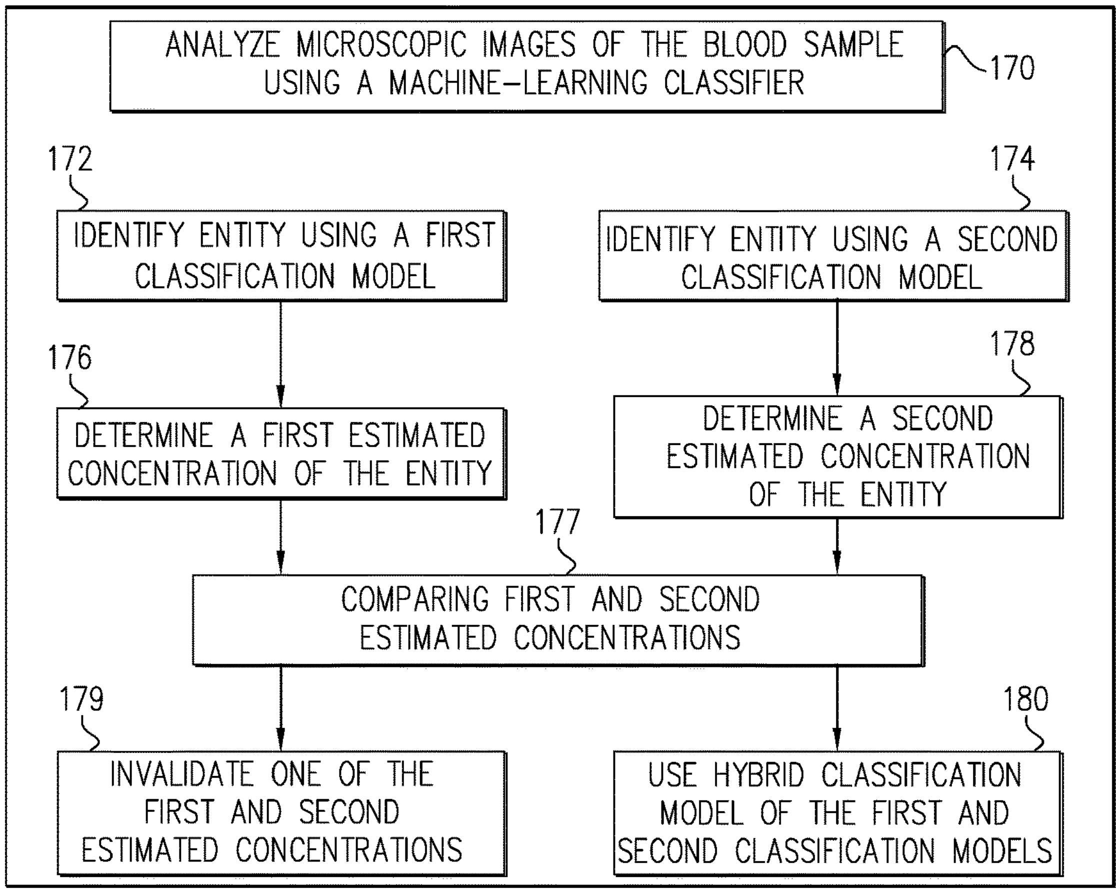
FIG. 8 is a flowchart showing steps of a method that are performed, in accordance with some applications of the present invention.

For some applications, and as shown in the flowchart in FIG. 8, in analyzing microscopic images of the blood sample using a machine-learning classifier (step 170), first and second classification models (and, optionally additional classification models) are used to identify an entity within a sample (steps 172 and 174), and a concentration of the entity as identified using each of the first and second classification models is estimated (steps 176 and 178). The estimated concentrations are typically compared to each other (step 177). For some applications, in response to the comparison, at least one of the estimated concentrations is invalidated (step 179) (e.g., in response to the discrepancy between the estimated concentrations exceeding a threshold). For example, both of the estimated concentrations may be invalidated. For some applications, in response to the comparison, a classification model that is a hybrid of the first and second classification models is used for identifying the entity (step 180). Typically, a smoothing function such as linear interpolation or hyperbolic tangent is used to generate the hybrid classification model. For some applications, the hybrid model is parameterized by concentration of one or more entities in the sample or other features that are indicative of a characteristic of the overall sample.

Some further examples of applications of the above-described algorithms are now described:

Example 1—Platelet Concentration

A concentration in the range of less than a given number of platelets per microliter, e.g., less than 100,000 platelets per microliter (e.g., less than 50,000 platelets per microliter) is typically clinically relevant for the diagnosis and treatment of thrombocytopenia. Furthermore, an even lower platelet count (e.g., a count of less than 10,000 platelets per microliter) is typically interpreted as indicating a need to administer a platelet transfusion. Therefore, the required absolute accuracy of the platelet count at these ranges is typically higher. Therefore, for some applications, a classification model having a high specificity is used when the concentration of platelets is close to the indicated concentrations. For some applications, a plurality of classification models are used, if the platelet concentration is close to the indicated concentrations. For some applications, in response to the classification models yielding different concentrations (or in response to the discrepancy between the concentration as determined using the different models exceeding a threshold), then a hybrid model is used, e.g., as described hereinabove.

Example 2—Pathogen Concentration

At low concentrations of a given pathogen (e.g., plasmodium, babesia, etc.), the ratio between occurrences of the pathogen itself and occurrences within the sample of elements that have similar characteristics to the pathogen (i.e., background similar elements) is lower. Moreover, it is typically important to determine if the patient is in fact infected. Therefore, in such situations, a classification model having a relatively high specificity (i.e., lower false positive rate) is typically used in order to distinguish between occurrences of the pathogen itself and background similar elements (which may have been identified as candidates of the pathogen). By contrast, at higher concentrations of the pathogen, the ratio between occurrences of the pathogen itself and occurrences within the sample of elements that have similar characteristics to the pathogen (i.e., background similar elements) is higher. Moreover, in such situations, determining the severity of the infection (as measured by the concentration of the pathogen), rather than detecting the mere presence of the infection, is typically of greater importance. Therefore, in such situations, a classification model having a relatively high sensitivity is typically used for identifying the pathogen.

Example 3—Rare Blood Cell Populations

A similar technique to that described in Example 2 may be applied to abnormal or rare blood cell populations such as basophils, blasts, nucleated red blood cells, activated platelets, etc. (each of which is referred to herein as a "rare blood cell type"). At low concentrations of a rare blood cell type, the ratio between occurrences of the rare blood cell type itself and occurrences within the sample of elements that have similar characteristics to the rare blood cell type (i.e., background similar elements) is lower. Moreover, it is typically important to determine if the rare blood cell type is in fact present within the patient's blood. Therefore, in such situations, a classification model having a relatively high specificity (i.e., lower false positive rate) is typically used in order to distinguish between occurrences of the rare blood cell type itself and background similar elements (which may have been identified as candidates of the rare blood cell type). By contrast, at higher concentrations of the rare blood cell type, the ratio between occurrences of the rare blood cell type itself and occurrences within the sample of elements that have similar characteristics to the rare blood cell type (i.e., background similar elements) is higher. Moreover, in such situations, determining the prevalence of the rare blood cell type (as measured by the concentration of the rare blood cell type), rather than detecting the mere presence of the rare blood cell type, is typically of greater importance. Therefore, in such situations, a classification model having a relatively high sensitivity is typically used for identifying the rare blood cell type.

For some applications, the apparatus and methods described herein are applied to a biological sample, such as, blood, saliva, semen, sweat, sputum, vaginal fluid, stool, breast milk, bronchoalveolar lavage, gastric lavage, tears and/or nasal discharge, mutatis mutandis. The biological sample may be from any living creature, and is typically from warm blooded animals. For some applications, the biological sample is a sample from a mammal, e.g., from a human body. For some applications, the sample is taken from any domestic animal, zoo animals and farm animals, including but not limited to dogs, cats, horses, cows and sheep. Alternatively or additionally, the biological sample is taken from animals that act as disease vectors including deer or rats.

For some applications, the apparatus and methods described herein are applied to a non-bodily sample. For some applications, the sample is an environmental sample, such as, a water (e.g. groundwater) sample, surface swab, soil sample, air sample, or any combination thereof, mutatis mutandis. In some embodiments, the sample is a food sample, such as, a meat sample, dairy sample, water sample, wash-liquid sample, beverage sample, and/or any combination thereof.

For some applications, the sample as described herein is a sample that includes blood or components thereof (e.g., a diluted or non-diluted whole blood sample, a sample including predominantly red blood cells, or a diluted sample including predominantly red blood cells), and parameters are determined relating to components in the blood such as platelets, white blood cells, anomalous white blood cells, circulating tumor cells, red blood cells, reticulocytes, Howell-Jolly bodies, etc.

Applications of the invention described herein can take the form of a computer program product accessible from a computer-usable or computer-readable medium (e.g., a non-transitory computer-readable medium) providing program code for use by or in connection with a computer or any instruction execution system, such as computer processor 28. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Typically, the computer-usable or computer readable medium is a non-transitory computer-usable or computer readable medium.

Examples of a computer-readable medium include a semiconductor or solid state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor (e.g., computer processor 28) coupled directly or indirectly to memory elements (e.g., memory 30) through a system bus. The memory elements can include local memory employed during actual execution of the program code, bulk storage, and cache memories which provide temporary storage of at least some program code in order to reduce the number of times code must be retrieved from bulk storage during execution. The system can read the inventive instructions on the program storage devices and follow these instructions to execute the methodology of the embodiments of the invention.

Network adapters may be coupled to the processor to enable the processor to become coupled to other processors or remote printers or storage devices through intervening private or public networks. Modems, cable modem and Ethernet cards are just a few of the currently available types of network adapters.

Computer program code for carrying out operations of the present invention may be written in any combination of one or more programming languages, including an object-oriented programming language such as Java, Smalltalk, C++ or the like and conventional procedural programming languages, such as the C programming language or similar programming languages.

It will be understood that algorithms described herein, can be implemented by computer program instructions. These computer program instructions may be provided to a processor of a general-purpose computer, special purpose computer, or other programmable data processing apparatus to produce a machine, such that the instructions, which execute via the processor of the computer (e.g., computer processor 28) or other programmable data processing apparatus, create means for implementing the functions/acts specified in the algorithms described in the present application. These computer program instructions may also be stored in a computer-readable medium (e.g., a non-transitory computer-readable medium) that can direct a computer or other programmable data processing apparatus to function in a particular manner, such that the instructions stored in the computer-readable medium produce an article of manufacture including instruction means which implement the function/act specified in the flowchart blocks and algorithms. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the algorithms described in the present application.

Computer processor 28 is typically a hardware device programmed with computer program instructions to produce a special purpose computer. For example, when programmed to perform the algorithms described herein, computer processor 28 typically acts as a special purpose sample-analysis computer processor. Typically, the operations described herein that are performed by computer processor 28 transform the physical state of memory 30, which is a real physical article, to have a different magnetic polarity, electrical charge, or the like depending on the technology of the memory that is used.

The apparatus and methods described herein may be used in conjunction with apparatus and methods described in any one of the following patents or patent applications, all of which are incorporated herein by reference:

U.S. Pat. No. 9,522,396 to Bachelet;
U.S. Pat. No. 10,176,565 to Greenfield;
U.S. Pat. No. 10,640,807 to Pollak;
U.S. Pat. No. 9,329,129 to Pollak;
U.S. Pat. No. 10,093,957 to Pollak;
U.S. Pat. No. 10,831,013 to Yorav Raphael;
U.S. Pat. No. 10,843,190 to Bachelet;
U.S. Pat. No. 10,482,595 to Yorav Raphael;
U.S. Pat. No. 10,488,644 to Eshel;
WO 17/168411 to Eshel;
US 2019/0302099 to Pollak;
US 2019/0145963 to Zait; and
WO 19/097387 to Yorav-Raphael.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method comprising:

analyzing one or more microscopic images of the blood sample using a machine-learning classifier, the analyzing comprising:

identifying platelets within the one or more microscopic images using a first classification model;

determining a first estimated concentration of the platelets within the sample, based upon the platelets as identified using the first classification model;

identifying the platelets within the one or more microscopic images using a second classification model;

determining a second estimated concentration of the platelets within the sample, based upon the platelets as identified using the second classification model;

comparing the first and second estimated concentrations to each other;

based on the comparison, determining that at least one of the estimated concentrations is close to a threshold platelet-concentration value that is of clinical relevance; and using a hybrid classification model that is a hybrid of the first and second classification models, in response thereto.

2. The method according to claim 1, wherein determining that at least one of the estimated concentrations is close to the threshold platelet-concentration value that is of clinical relevance comprises determining that the first estimated concentration is less than the threshold platelet-concentration value and the second estimated concentration is greater than the threshold platelet-concentration value.

3. Apparatus comprising:

a microscope configured to acquire one or more microscopic images of the blood sample;

an output device; and at least one computer processor configured to:

analyze the one or more microscopic images of the blood sample using a machine-learning classifier, the analyzing comprising:

identifying platelets within the one or more microscopic images using a first classification model, determining a first estimated concentration of the platelets within the sample, based upon the platelets as identified using the first classification model, identifying the platelets within the one or more microscopic images using a second classification model, determining a second estimated concentration of the platelets within the sample, based upon the platelets as identified using the second classification model, comparing the first and second estimated concentrations to each other, and based on the comparison, determining that at least one of the estimated concentrations is close to a threshold platelet-concentration value that is of clinical relevance; and in response thereto, using a hybrid classification model that is a hybrid of the first and second classification models, and generate an output on the output device based upon analyzing the one or more microscopic images of the blood sample using the machine-learning classifier.

4. The apparatus according to claim 3, wherein the computer processor is configured to determine that at least one of the estimated concentrations is close to the threshold platelet-concentration value that is of clinical relevance by determining that the first estimated concentration is less than the threshold platelet-concentration value and the second estimated concentration is greater than the threshold platelet-concentration value.

* * * * *